(12) United States Patent
Bibl et al.

(10) Patent No.: US 12,317,023 B2
(45) Date of Patent: *May 27, 2025

(54) ELECTRONIC DEVICE ACCESSORIES FORMED FROM INTERTWINED FIBERS

(71) Applicant: Apple Inc., Cupertino, CA (US)

(72) Inventors: David Bibl, Santa Cruz, CA (US); Matthew Rohrbach, San Francisco, CA (US); Peter Russell-Clarke, San Francisco, CA (US)

(*) Notice: Subject to any disclaimer, the term of this patent is extended or adjusted under 35 U.S.C. 154(b) by 113 days.

This patent is subject to a terminal disclaimer.

(21) Appl. No.: 18/303,014

(22) Filed: Apr. 19, 2023

(65) Prior Publication Data

US 2023/0276163 A1    Aug. 31, 2023

Related U.S. Application Data

(63) Continuation of application No. 16/894,674, filed on Jun. 5, 2020, now Pat. No. 11,665,461, which is a
(Continued)

(51) Int. Cl.
*H04R 1/10* (2006.01)
*G06F 3/044* (2006.01)
*H04R 5/033* (2006.01)

(52) U.S. Cl.
CPC ............ *H04R 1/1033* (2013.01); *G06F 3/044* (2013.01); *H04R 1/1041* (2013.01); *H04R 5/033* (2013.01); *Y10T 29/49018* (2015.01)

(58) Field of Classification Search
CPC .... H04R 1/1033; H04R 1/1041; H04R 5/033; G06F 3/044; G06F 3/02; Y10T 29/49018
(Continued)

(56) References Cited

U.S. PATENT DOCUMENTS

| 1,523,051 A | 1/1925 | Carpenter et al. |
| 2,446,292 A | 8/1948 | Mcconnell et al. |

(Continued)

FOREIGN PATENT DOCUMENTS

| CN | 2655316 Y | 11/2004 |
| CN | 2731516 Y | 10/2005 |

(Continued)

OTHER PUBLICATIONS

Tascan et al., "Effects of Finer Denier, Fiber Cross-Sectional Shape and Fabric Density on Acoustical Behavior of Vertically Lapped Ninwoven Fabrics" Journal of Engineered Fibers and Fabrics, vol. 3, No. 2, pp. 32-38, Jan. 1, 2008.
(Continued)

*Primary Examiner* — Vivian C Chin
*Assistant Examiner* — Con P Tran
(74) *Attorney, Agent, or Firm* — Treyz Law Group, P.C.; G. Victor Treyz; Kendall P. Woodruff

(57) ABSTRACT

Fibers may be intertwined to form structures for electronic devices and other parts. Fibers may be intertwined using computer-controlled braiding, weaving, and knitting equipment. Binder materials may be selectively incorporated into the intertwined fibers. By controlling the properties of the intertwined fibers and the patterns of incorporated binder, structures can be formed that include antenna windows, sound-transparent and sound-blocking structures, structures that have integral rigid and flexible portions, and tubes with seamless forked portions. Fiber-based structures such as these may be used to form cables and other parts of headphones or other electronic device accessories, housings for electronic devices such as housings for portable computers, and other structures.

20 Claims, 38 Drawing Sheets

Related U.S. Application Data continuation of application No. 15/476,793, filed on Mar. 31, 2017, now Pat. No. 10,681,447, which is a continuation of application No. 12/637,355, filed on Dec. 14, 2009, now Pat. No. 9,628,890.

(60) Provisional application No. 61/185,934, filed on Jun. 10, 2009.

(58) Field of Classification Search
USPC ......... 381/74, 394, 386, 380, 374, 370, 150, 381/336, 387, 123; 427/372.2; 385/101, 385/100, 76, 39; 242/920, 444.1; 174/124 R, 150 R, 102 R, 27, 24; 57/200; 87/8; 139/11; 200/505; 73/514.32

See application file for complete search history.

(56) References Cited

U.S. PATENT DOCUMENTS

| | | | |
|---|---|---|---|
| 3,448,823 | A | 6/1969 | Smith |
| 3,453,373 | A | 7/1969 | Yamamtot et al. |
| 3,899,380 | A | 8/1975 | Pihlstrom |
| 4,663,498 | A | 5/1987 | Rye |
| 4,807,962 | A | 2/1989 | Arroyo et al. |
| 4,936,186 | A | 6/1990 | Sekido et al. |
| 5,282,846 | A | 2/1994 | Schmitt |
| 5,385,580 | A | 1/1995 | Schmitt |
| 5,706,168 | A | 1/1998 | Erler et al. |
| 5,731,062 | A | 3/1998 | Kim et al. |
| 5,953,434 | A | 9/1999 | Boyden |
| 6,003,563 | A | 12/1999 | Uchida et al. |
| 6,156,682 | A | 12/2000 | Fletemier et al. |
| 6,172,871 | B1 | 1/2001 | Holung et al. |
| 6,210,422 | B1 | 4/2001 | Douglas |
| 6,454,796 | B1 | 9/2002 | Barkman et al. |
| 6,523,476 | B1 | 2/2003 | Riess et al. |
| 6,545,223 | B2 | 4/2003 | Baldock |
| 6,576,832 | B2 | 6/2003 | Svarfvar et al. |
| 6,617,023 | B2 | 9/2003 | Tsutsui et al. |
| 6,744,901 | B2 | 6/2004 | Ito et al. |
| 7,012,189 | B2 | 3/2006 | Kriege et al. |
| 7,335,006 | B2 | 2/2008 | Wilson et al. |
| 7,833,055 | B2 | 11/2010 | Crooijmans et al. |
| 2002/0088931 | A1 | 7/2002 | Danisch et al. |
| 2002/0106952 | A1 | 8/2002 | Hashizume et al. |
| 2003/0026984 | A1 | 2/2003 | Nagayama et al. |
| 2004/0227679 | A1 | 11/2004 | Lu |
| 2005/0062486 | A1 | 3/2005 | Qi et al. |
| 2006/0083907 | A1 | 4/2006 | Bech et al. |
| 2006/0110599 | A1 | 5/2006 | Honma et al. |
| 2006/0216469 | A1 | 9/2006 | Hashizume et al. |
| 2006/0233413 | A1 | 10/2006 | Nam |
| 2007/0036383 | A1* | 2/2007 | Romero ............... H04R 1/1016 381/370 |
| 2007/0237170 | A1 | 10/2007 | Protector et al. |
| 2007/0277995 | A1 | 12/2007 | Sakai |
| 2008/0019554 | A1 | 1/2008 | Krywko |
| 2008/0166003 | A1 | 7/2008 | Hankey et al. |
| 2009/0130995 | A1 | 5/2009 | Wang Chen |
| 2009/0136708 | A1 | 5/2009 | Huang et al. |
| 2009/0185340 | A1 | 7/2009 | Ji et al. |
| 2009/0190785 | A1 | 7/2009 | Sandberg |
| 2009/0233044 | A1 | 9/2009 | Sun et al. |
| 2009/0296952 | A1 | 12/2009 | Pantfoerder et al. |
| 2010/0039269 | A1* | 2/2010 | Newham ............... A61B 5/6887 340/573.4 |
| 2010/0056232 | A1 | 3/2010 | Lim et al. |
| 2010/0178479 | A1 | 7/2010 | Lee |

FOREIGN PATENT DOCUMENTS

| | | |
|---|---|---|
| CN | 1788522 A | 6/2006 |
| CN | 201008404 Y | 1/2008 |
| DE | 19734283 A1 | 2/1999 |
| GB | 250765 A | 4/1926 |
| JP | S62139207 A | 6/1987 |
| JP | 2001103578 A | 4/2001 |
| JP | 2002374596 A | 12/2002 |
| JP | 2004253391 A | 9/2004 |
| JP | 2005519548 A | 6/2005 |
| JP | 2005/191842 A | 7/2005 |
| JP | 2008269799 A | 11/2008 |
| TW | 200923619 A | 6/2009 |
| WO | 2000/74075 A1 | 12/2000 |
| WO | 2002/103713 A1 | 12/2002 |
| WO | 2004/078461 A1 | 9/2004 |
| WO | 2006/045988 A1 | 5/2006 |
| WO | 2007/041256 A2 | 4/2007 |

OTHER PUBLICATIONS

"Sony VAIO VGN-SZ381P/X" {online]. Sony Electronics Inc. 2006 [retrieved on Dec. 7, 2009]: <URL: http://www/docs.sony.com/release/specs/VGNSZ381Px_mks.pdf>.

* cited by examiner

ELECTRONIC DEVICE ACCESSORIES FORMED FROM INTERTWINED FIBERS

This application is a continuation of patent application Ser. No. 16/894,674, filed Jun. 5, 2020, which is a continuation of patent application Ser. No. 15/476,793, filed Mar. 31, 2017, now U.S. Pat. No. 10,681,447, which is a continuation of patent application Ser. No. 12/637,355, filed Dec. 14, 2009, now U.S. Pat. No. 9,628,890, which claims the benefit of provisional patent application No. 61/185,934, filed Jun. 10, 2009, all of which are hereby incorporated by reference herein in their entireties.

BACKGROUND

This invention relates to structures formed from intertwined fibers, and more particularly, to ways in which to form structures for electronic devices from intertwined fibers.

Modern weaving, braiding, and knitting equipment can be used to create structures that would be difficult or impossible to implement using other fabrication technologies. For example, woven carbon fiber sheets may be used to form housing structures for electronic devices that are lighter and stronger than housing structures formed from other materials. Flexible cable sheaths may be formed using fiber braiding tools. Many medical devices are formed from fibers. For example, bifurcated vascular grafts and other cardiovascular devices may be formed from fibers.

SUMMARY

Intertwined fibers may be used in forming sheaths for cables, parts of accessories such as headsets, and other structures.

Fiber intertwining equipment such as tools for weaving, braiding, and knitting may be used to intertwine fibers. The fibers that are intertwined with this equipment may include polymer fibers, metal fibers, insulator-coated metal fibers, glass fibers, or other suitable fibers. Once intertwined, a binder such as epoxy or other suitable matrix may be incorporated into the intertwined structure and cured.

Parameters that may be varied during the fabrication process include the number of fibers that are incorporated into a particular region of the structure, the spacing between fibers, fiber type, binder type, binder location, etc. By selectively varying these factors, structures can be formed in which different regions of the structures have different flexibilities, different densities (e.g., to adjust audio transparency, moisture penetration, etc.), different conductivities, etc. Shapes that may be formed using the intertwining equipment include forking structures (e.g., bifurcated structures), tubular structures of variable diameter, structures that have potentially complex compound curves, etc.

Further features of the invention, its nature and various advantages will be more apparent from the accompanying drawings and the following detailed description of the preferred embodiments.

DETAILED DESCRIPTION

Figure 1:
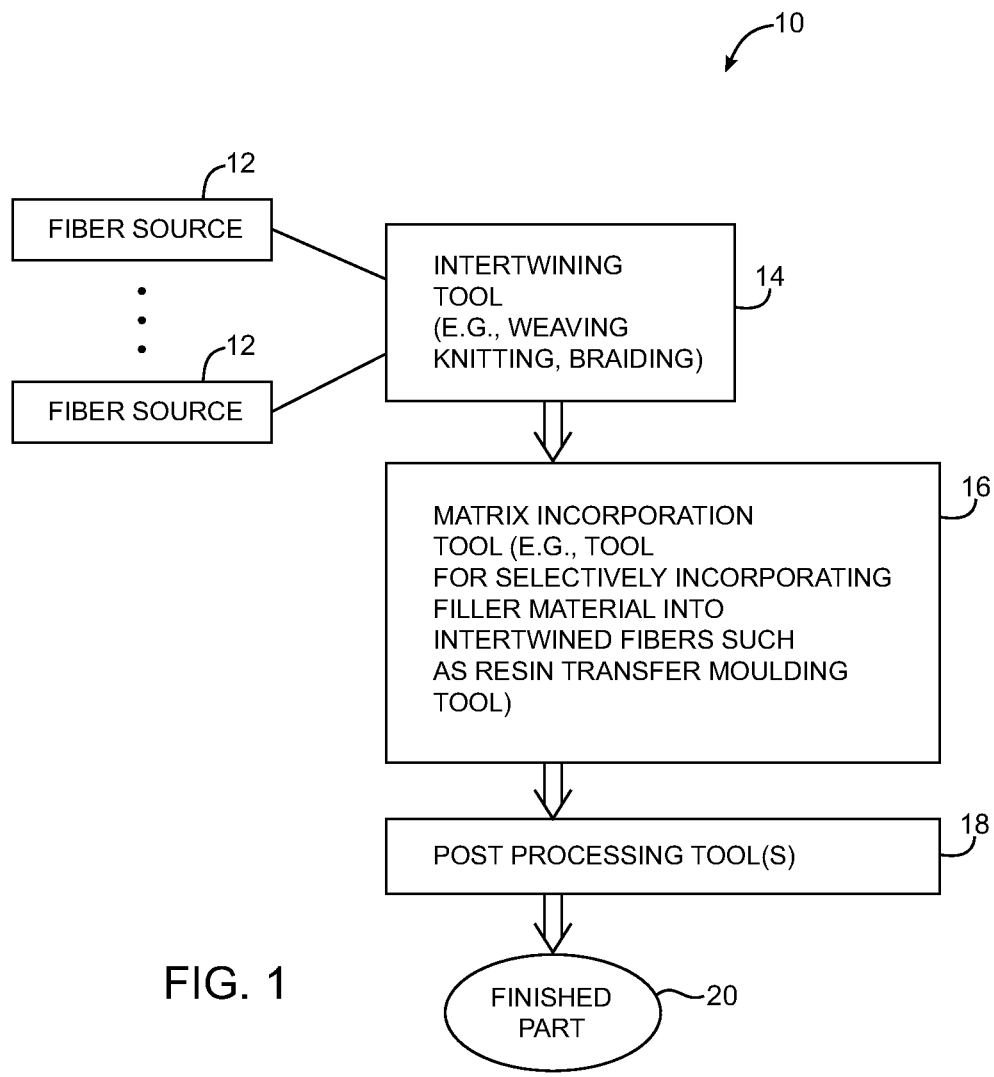
FIG. 1 is a schematic diagram of illustrative fabrication equipment that may be used to fabricate structures with intertwined fibers in accordance with an embodiment of the present invention.

A schematic diagram of illustrative fabrication equipment that may be used to fabricate structures with intertwined fibers in accordance with an embodiment of the present invention is shown in FIG. 1. Fabrication equipment may be used to form fiber-based structures for any suitable device. Examples in which fabrication equipment 10 is used to form parts of electronic devices such as electronic device housings, cable sheaths for headsets, electrical connectors, and other electrical equipment are sometimes described herein as an example. In general, however, fabrication equipment 10 may be used to form any suitable parts (e.g., parts for medical application, for industrial equipment, for mechanical structures with no electrical components, etc.).

As shown in FIG. 1, fabrication equipment 10 may be provided with fibers from fiber sources 12. Fiber sources 12 may provide fibers of any suitable type. Examples of fibers include metal fibers (e.g., strands of steel or copper), glass fibers (e.g., fiber-optic fibers that can internally convey light through total internal reflection), plastic fibers, etc. Some fibers may exhibit high strength (e.g., polymers such as aramid fibers). Other fibers such as nylon may offer good abrasion resistance (e.g., by exhibiting high performance on a Tabor test). Yet other fibers may be highly flexible (e.g., to stretch without exhibiting plastic deformation). The fibers provided by sources 12 may be magnetic fibers, conducting fibers, insulating fibers, or fibers with other material properties.

Fibers may be relatively thin (e.g., less than 20 microns or less than 5 microns in diameter—i.e., carbon nanotubes or carbon fiber) or may be thicker (e.g., metal wire). The fibers provided by sources 12 may be formed from twisted bundles of smaller fibers (sometimes referred to as filaments) or may be provided from sources 12 as unitary fibers of a single untwisted material. Regardless of their individual makeup (i.e. whether thick, thin, or twisted or otherwise formed from smaller fibers), the strands of material from fiber sources 12 are referred to herein as fibers. The fiber from sources 12 may also sometimes be referred to as cords, threads, ropes, yarns, filaments, strings, twines, etc.

Intertwining tool(s) 14 may be based on any suitable fiber intertwining technology. For example, intertwining equipment 14 may include computer-controlled weaving tools, computer-controlled braiding tools (e.g., for forming tubular structures), and/or computer-controlled knitting equipment (e.g., three-dimensional knitting tools capable of producing intertwining fiber structures with bifurcations, compound curves, and other such complex shapes). These tools are sometimes referred to collectively herein as intertwining tool(s) 14.

Tools 14 form intertwined fiber structures. Matrix incorporation tools(s) 16 may be used to incorporate binder material into the intertwined fiber (e.g., to provide these structures with rigidity or other suitable properties). The binder, which is sometimes referred to as a matrix, may be formed from epoxy or other suitable materials. These materials may sometimes be categorized as thermoset materials (e.g., materials such as epoxy that are formed from a resin that cannot be reflowed upon reheating) and thermoplastics (e.g., materials such as acrylonitrile butadiene styrene, polycarbonate, and ABS/PC blends that are repeatable). Both thermoset materials and thermoplastics and combinations of thermoset materials and thermoplastic materials may be used as binders if desired.

Tools 16 may include molds, spraying equipment, and other suitable equipment for incorporating binder into portions of the intertwined fibers produced by intertwining equipment 14. Tools 16 may, if desired, include computer-controlled equipment and/or manually operated equipment that can selectively incorporate binder into different portions of a workpiece in different amounts. For example, when it is desired to stiffen a fiber structure, more resin can be incorporated into the intertwined fiber, whereas less resin can be incorporated into the intertwined fiber when a flexible structure is being formed. Different portions of the same structure can be formed with different flexibilities in this way. Following curing (e.g., using heat or ultraviolet light, the binder will stiffen and harden). The resulting structure (called finished part 20 in FIG. 1) can be used in a computer structure, a structure for other electrical equipment, etc.

Figure 2:
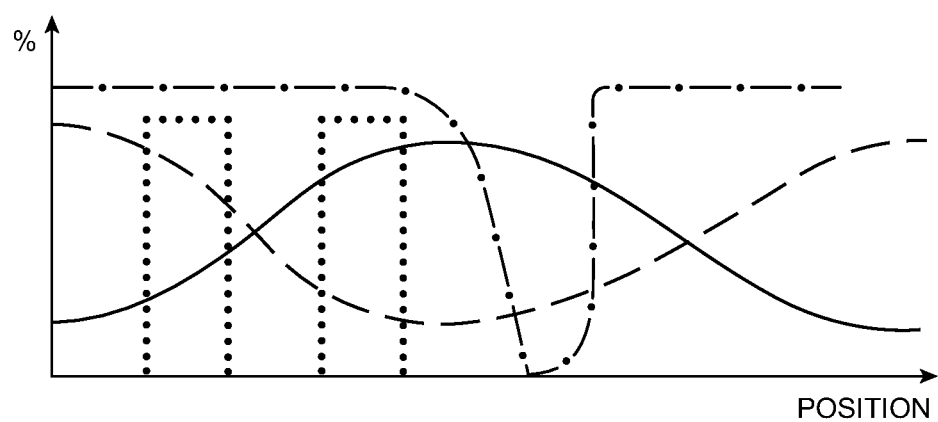
FIG. 2 is a graph showing how parameters such as intertwining parameters and binder incorporation parameters may be varied as a function of position within a structure when fabricating the structure in accordance with an embodiment of the present invention.

A graph showing how parameters such as intertwining parameters and binder incorporation parameters may be varied as a function of position within a structure when fabricating the structure is shown in FIG. 2. The horizontal axis in the graph of FIG. 2 represents position within a fiber-based structure (e.g., length along a cable or lateral distance across a planar surface). The vertical axis represents the magnitude of the parameter that is being varied. As the lines of the graph of FIG. 2 indicate, parameters can be varied smoothly and continuously, discretely, in an increasing fashion, decreasing, periodically, etc. Examples of parameters that can be varied according to the lines of the graph of FIG. 2 include the number of fibers in a given area, the size of the individual fibers, the spacing between adjacent fibers (porosity or fiber density), the type of filaments being used (e.g., the amount which a fiber or collection of fibers is insulating, abrasion-resistant, conducting, strong, magnetic, etc.), and the amount and/or type of binder being incorporated.

Figure 3:
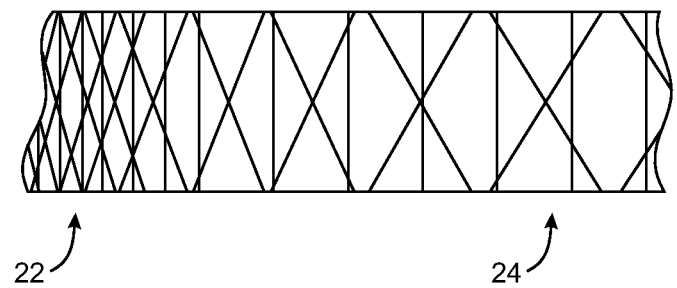
FIG. 3 is a side view of an illustrative structure showing how the number of fibers per unit area may be varied as a function of position in accordance with an embodiment of the present invention.

FIG. 3 is a side view of an illustrative structure such as a tube or planar patch of intertwined fiber showing how the number of fibers per unit area may be varied as a function of position. In region 22 there are more fibers per unit area than in region 24. The portion of the structure in region 24 will tend to be weaker, more porous, and therefore transparent to moisture and sound, lighter, and more flexible than the portion of the structure in region 22.

Figure 4:
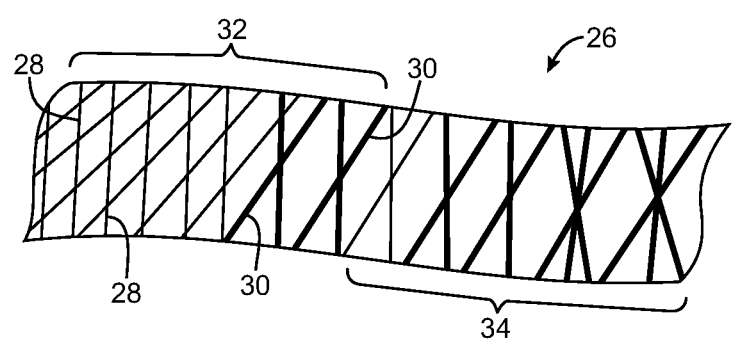
FIG. 4 is a side view of an illustrative structure showing how the type of fiber that is used may be varied as a function of position in accordance with an embodiment of the present invention.

As shown in FIG. 4, structure 26 may have two or more different types of fibers such as fibers 28 and fibers 30. These fibers may have different properties. In the FIG. 4 example, there are more of fibers 28 in region 32 than fibers 30. In region 34, however, fibers 30 are more prevalent than fibers 28. This type of spatial variation of fiber type allows the properties of structure 26 to be spatially adjusted during fabrication with equipment 10.

Figure 5:
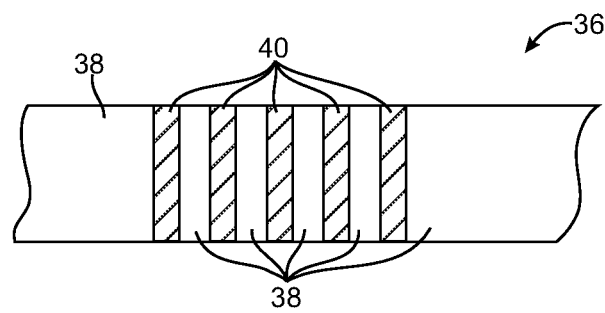
FIGS. 5, 6, and 7 are side views of illustrative binder incorporation patterns that may be used when forming structures in accordance with an embodiment of the present invention.
Figure 6:
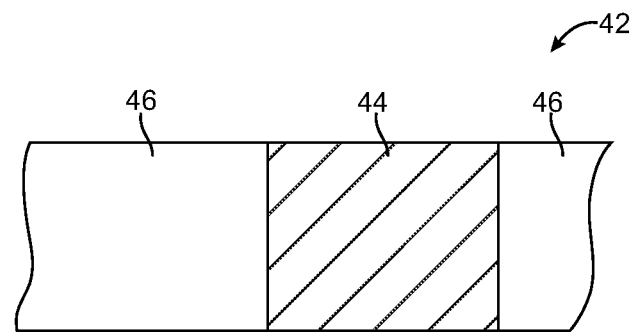
Figure 7:
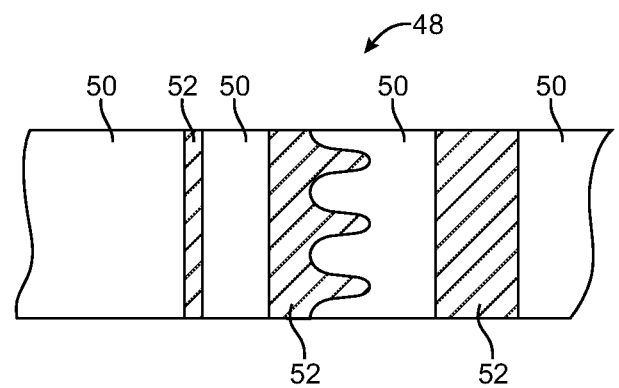

FIGS. 5, 6, and 7 are examples of structures in which binder has been incorporated in different patterns. In structure 36 of FIG. 5, intertwined fiber portions 38 may be formed without binder, whereas portions 40 may include binder. Structure 36 may be a fiber tube or a planar fiber-based structure (as examples). In structure 42 of FIG. 6, there is only a single relatively large portion of binder (region 44), while regions 46 are free of binder. In structure 48 of FIG. 7, regions 50 are binder-free, whereas regions 52 incorporate binder in different patterns.

Figure 8:
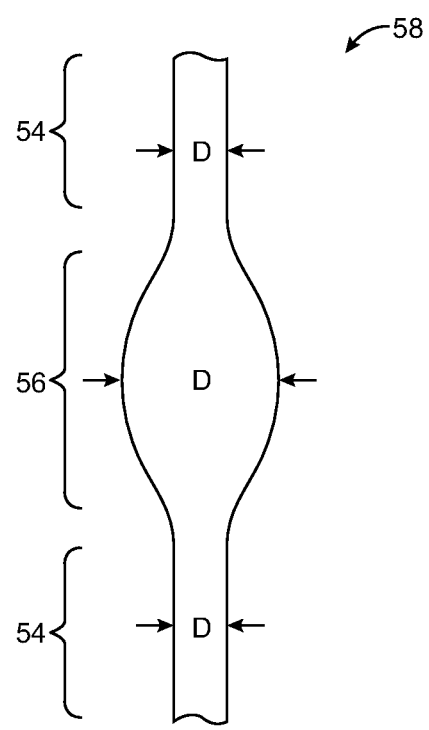
FIG. 8 is a view of an illustrative tubular structure with a diameter that has been varied during a fiber intertwining process in accordance with an embodiment of the present invention.

Equipment 10 can be used to form fiber-based structures of various shapes (e.g., tubes, planar members such as housing surfaces, spheres or parts of spheres, shapes with compound curves, cylinders or partial cylinders, cubes, tubes with bifurcations or regions of three- or more forked branches, combinations of these shapes, etc.). FIG. 8 shows how equipment 10 can form a tube or other structure 58 with a diameter D that is narrower in some regions (e.g., regions 54) than in other regions (e.g., region 56).

Figure 9:
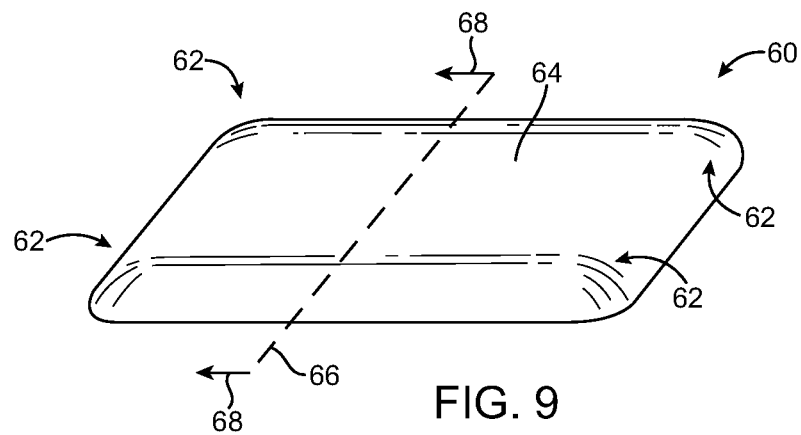
FIG. 9 is a perspective view of an illustrative electronic device having housing with compound curves that have been formed by intertwining fibers in accordance with an embodiment of the present invention.

A perspective view of an illustrative electronic device having a housing with compound curves is shown in FIG. 9. As shown in FIG. 9, device 60 may have a housing or other structure that has a planar rear surface portion such as portion 64. Device 60 may also have four corner portions 62. Each corner portion 62 has compound curves. These curves may be difficult or impossible to form from conventional woven-fiber sheets.

With equipment 10 of FIG. 1, three-dimensional (3D) knitting equipment or other intertwining tools 14 can be used to form a fiber-based structure (e.g., a housing or covering) that conforms to both the planar rear surface 64 and compound curve corners 62 of structure 60.

Figure 10:
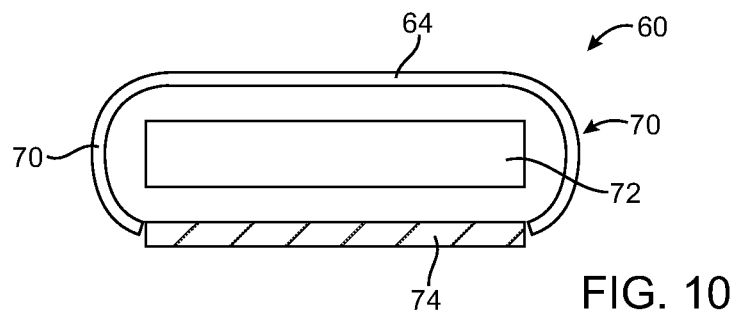
FIG. 10 is a cross-sectional side view of an illustrative electronic device having compound housing curves that have been formed by intertwining fibers and that contains electronic components and a display screen in accordance with an embodiment of the present invention.
Figure 11:
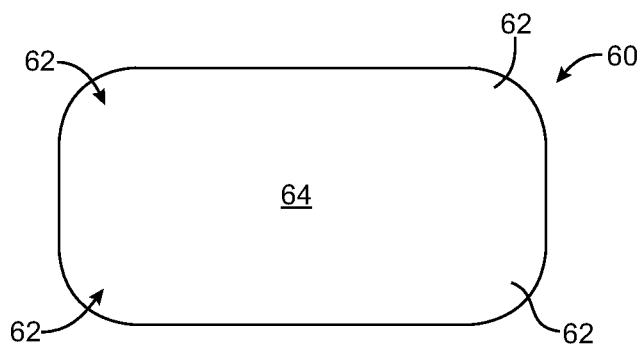
FIG. 11 is a rear view of an electronic device of the type shown in FIG. 10 in accordance with an embodiment of the present invention.

A cross-sectional side view of device 60 of FIG. 9 taken along line 66 of FIG. 9 and viewed in direction 68 is shown in FIG. 10. As shown in FIG. 10, device 10 may have curved sidewalls 70, a display or other front-mounted component 74, and internal electronic devices 72 (e.g., processor and memory circuitry). A rear view of device 60 is shown in FIG. 11, illustrating part of the curved shapes of corners 62 that can be covered smoothly without wrinkles or seams using the knit fiber produced by equipment 10.

Figure 12:
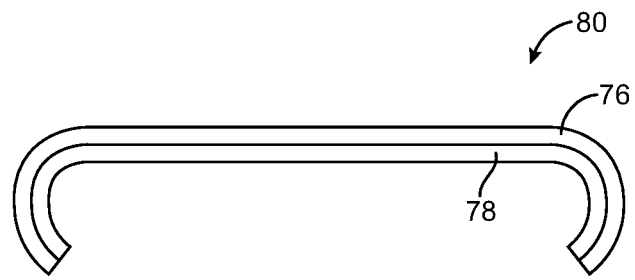
FIG. 12 is a cross-sectional side view of an illustrative structure having a layer of intertwined fibers that have been used to form a cosmetic cover layer and a fiber sheet that has been used to implement a structural support member in accordance with an embodiment of the present invention.

The ability of equipment 10 to produce thin layers of intertwined fiber that conform to complex non-planar shapes can be used to create a cosmetic cover layer with compound curves. As shown in FIG. 12, device housing 80 may have an inner layer 78 that is formed from a planar sheet of fiber with cut-away portions to accommodate compound curve housing shapes (e.g., corners 62 of FIG. 9). Layer 76 may be a conformal cosmetic cover layer formed using equipment 10. Layers 76 and/or layer 78 may be impregnated with binder using a matrix incorporation tool.

Figure 13:
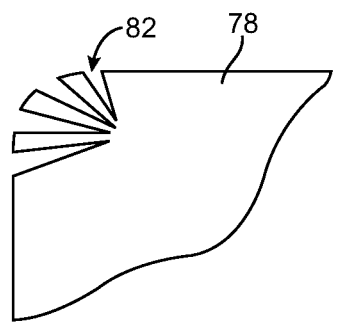
FIG. 13 is a top view of an illustrative fiber sheet of the type shown in FIG. 12 showing portions where material may be removed to help the fiber sheet accommodate a compound curve shape in accordance with an embodiment of the present invention.

FIG. 13 is a top view of a planar layer such as layer 78 that has removed portions 82 to accommodate compound curve shapes (e.g., housing corners). This process leaves unsightly seams that are hidden by cosmetic layer 76 (FIG. 12).

Figure 14:
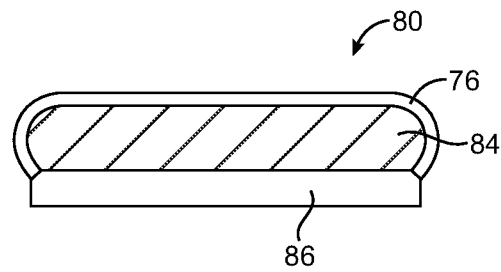
FIG. 14 is a cross-sectional side view of an illustrative structure in which an inner support structure such as a solid support or a skeletal frame has been covered with a layer of fiber that has been intertwined to accommodate a compound curve shape in accordance with an embodiment of the present invention.

FIG. 14 is a cross-sectional side view of device 80 showing how layer 76 may conformally cover an inner support structure (i.e., structure 84) and how device 80 may have a display module or other component 86 mounted to its front surface. Structure 84 may be solid, may be hollow (e.g., as in a frame or skeletal support), may include components, etc.

Figure 15:
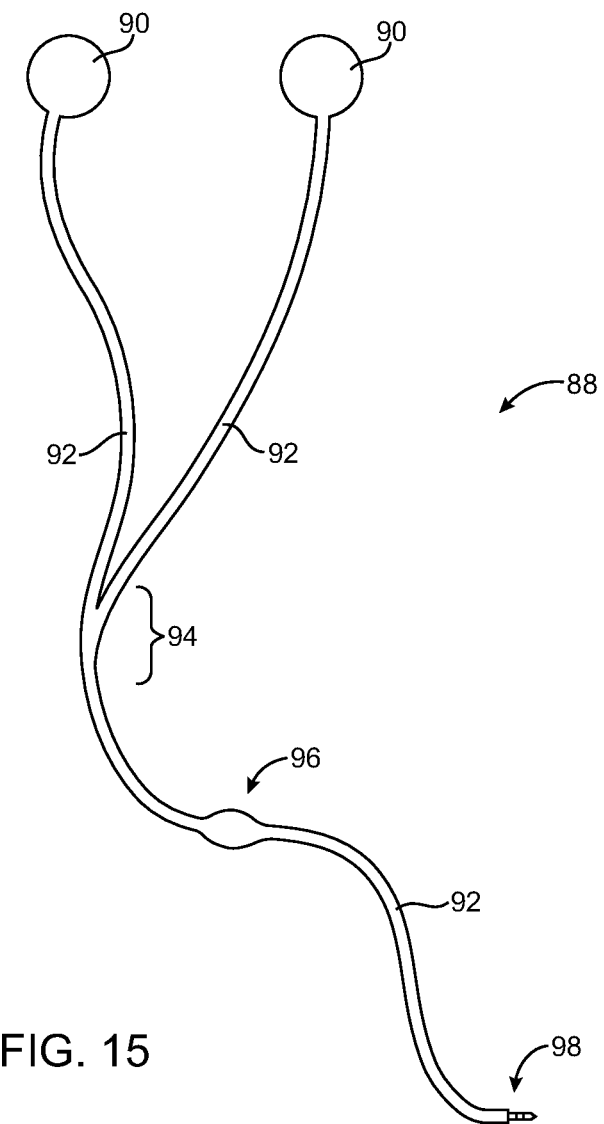
FIG. 15 is a perspective view of an illustrative electronic device that may be formed using intertwined fiber in accordance with an embodiment of the present invention.

An example of an electronic device accessory that may be formed from intertwined fiber structures is a pair of audio headphones. An illustrative headset is shown in FIG. 15. As shown in FIG. 15, headset 88 may include a main cable portion 92. Cable 92 may be formed from intertwined fibers and may have portions formed from different types and amounts of fibers and different patterns and amounts of binder (as examples). Earbuds 90 (i.e., earbuds that each contains one or more speakers) may be mounted at the ends of the right and left branches of cable 92. In region 94, cable 92 may have a bifurcation (forked region). Feature 96 may be an enclosure for a switch, microphone, etc. The end of cable 92 may be terminated by audio connector (plug) 98. Connector 98 may be, for example, a 3.5 mm audio plug that mates with a corresponding 3.5 mm audio jack in a media player, cellular telephone, portable computer, or other electronic device.

Figure 16:
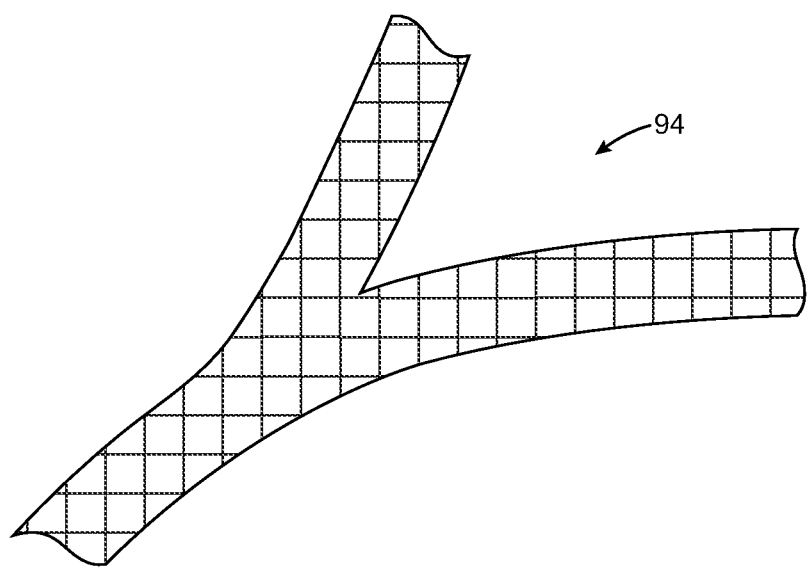
FIG. 16 is a perspective view of a forked (bifurcated) tubular structure formed with intertwining equipment in accordance with an embodiment of the present invention.
Figure 17:
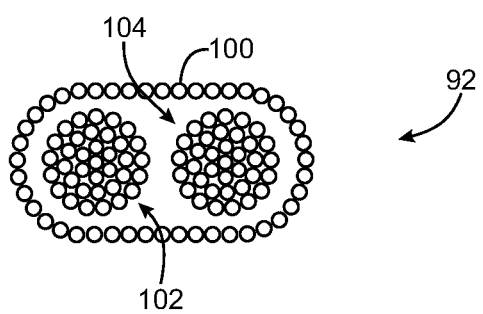
FIG. 17 is a cross-sectional view of a tubular structure such as a cable for an electronic device in accordance with an embodiment of the present invention.

FIG. 16 shows how intertwining tool 14 may, if desired, form Y-junction 94 of cable 92 without visible seams. A cross-sectional view of cable 92 is shown in FIG. 17. As shown in FIG. 17, cable 92 may have a tubular sheath such as sheath 100 that surrounds one, two, or more than two wires. In the FIG. 17 example, there are two conductive wire bundles within sheath 100. Wire bundle 102 may be formed from a first set of metal fibers and wire bundle 104 may be formed from a second set of wire bundles. The individual wires in bundles 102 and 104 may be coated with a thin layer of insulator (if desired). Sheath 100 may be formed from a fiber with sufficient strength to resist damage during use by a user and sufficient flexibility to allow cable 92 to flex. If desired, regions such as Y-junction region 94 and portions of device 88 near earbuds 90 and plug 98 may be provided with stronger fibers and more binder to strengthen these regions.

Figure 18:
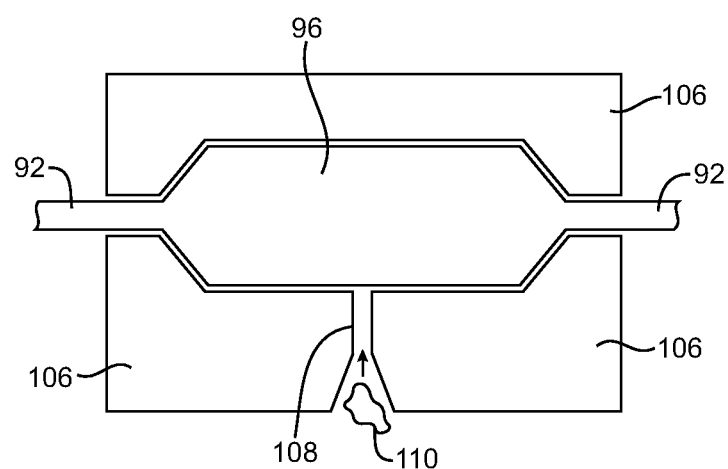
FIG. 18 is a cross-sectional side view of illustrative resin transfer mold equipment that may be used to selectively incorporate binder into intertwined fibers in accordance with an embodiment of the present invention.

Structure 96 may also be strengthened in this way. As an example, structure 96 may be impregnated with binder, whereas most of the rest of cable 92 may be left binder-free. FIG. 18 shows how a resin transfer molding tool such as tool 106 may be used to selectively incorporate binder 110 into region 96 of cable 92 (e.g., by introducing binder 110 into the interior of tool 106 through opening 108).

Figure 19:
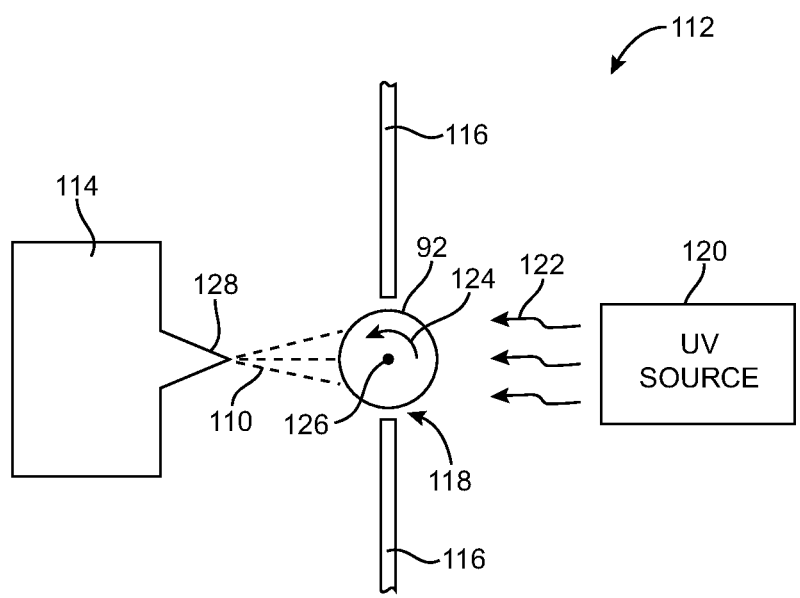
FIG. 19 is a top view of illustrative manufacturing equipment that may be used to incorporate binder into a tubular structure in accordance with an embodiment of the present invention.

As shown in FIG. 19, cable 92 may be rotated in direction 124 about longitudinal axis 126 while binder 110 is being sprayed onto cable 92 from spraying tool 114. Binder 110 may be cured using ultraviolet light 122 from ultraviolet light source 120. Shield 116 may prevent binder 110 from striking source 120 and may prevent light 122 from curing binder 110 at the exit of nozzle 128.

Figure 20:
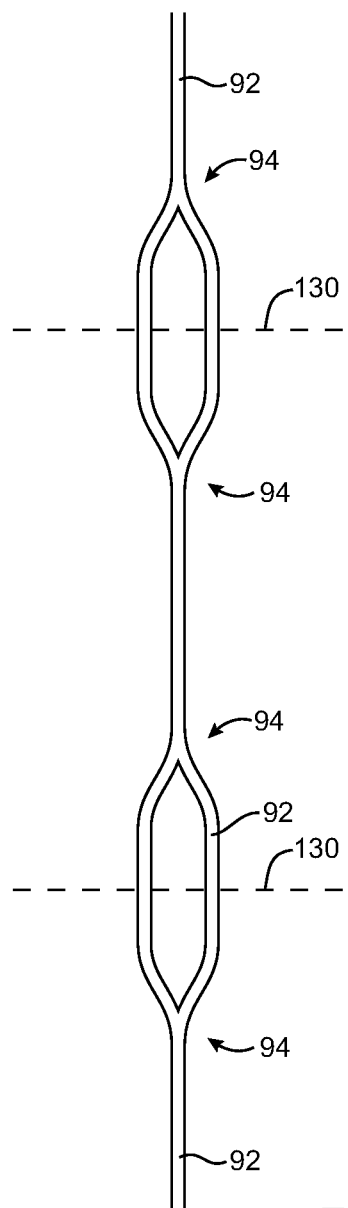
FIG. 20 is a view showing how a headset cables may be formed by cutting lengths of tube from a continuous tube of intertwined fiber having bifurcated sections in accordance with an embodiment of the present invention.

Equipment 10 may produce cable 92 using a continuous process. As shown in FIG. 20, equipment 10 may produce a cable shape that periodically forks to form two separate branches and then fuses so that the two branches form a single tubular structure. With this type of arrangement, post processing tools 18 of FIG. 1 may be used to cut cable 92 along cut lines 130.

Figure 21:
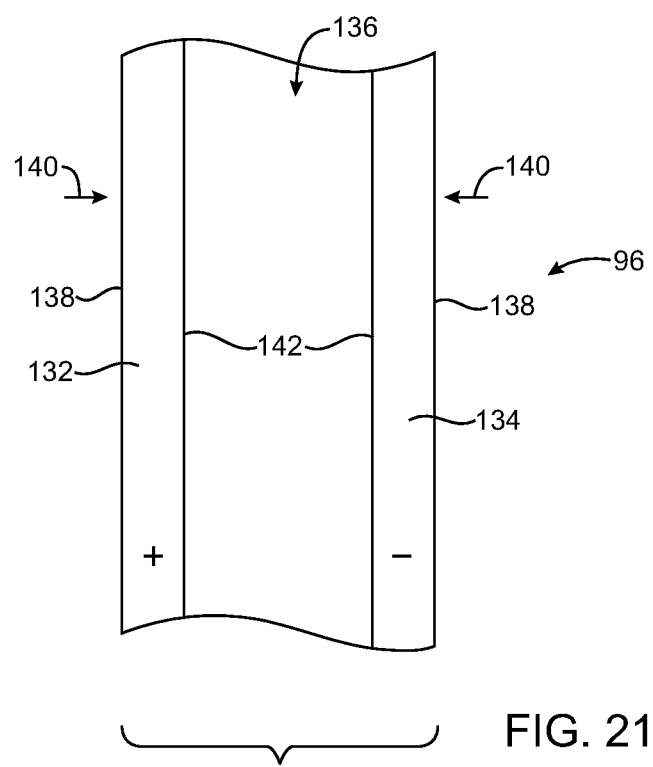
FIG. 21 is a cross-sectional view of an illustrative switch formed from intertwined conductive fibers in accordance with an embodiment of the present invention.

As shown in FIG. 21, cable 92 may be provided with conductive fibers such as fibers 132 and 134. This type of configuration may be produced when it is desired to form a switch in structure 96. As shown in FIG. 21, conductive fibers 132 and conductive fibers 134 in structure 96 may be separated by gap region 136. Region 136 may be filled with air (as an example). When a user squeezes outer edges inwardly in directions 140, opposing inner portions 142 of conductors 132 and 134 can meet, thereby closing the switch.

Figure 22:
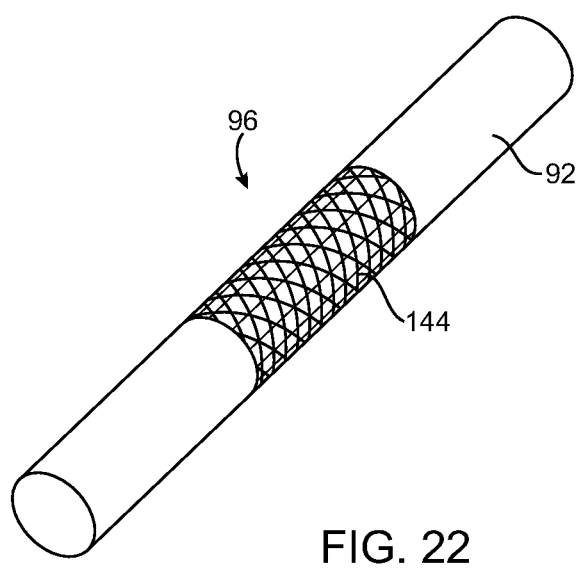
FIG. 22 is a perspective view of a tube of intertwined fibers having a conductive electrode portion for use in a switch or other structure in accordance with the present invention.

Conductive fibers on cable 92 may be used to form a capacitor electrode (e.g., as part of a switch based on a capacitive sensor). This type of configuration is illustrated by conductive fiber band 144 on cable 92 in FIG. 22.

Figure 23:
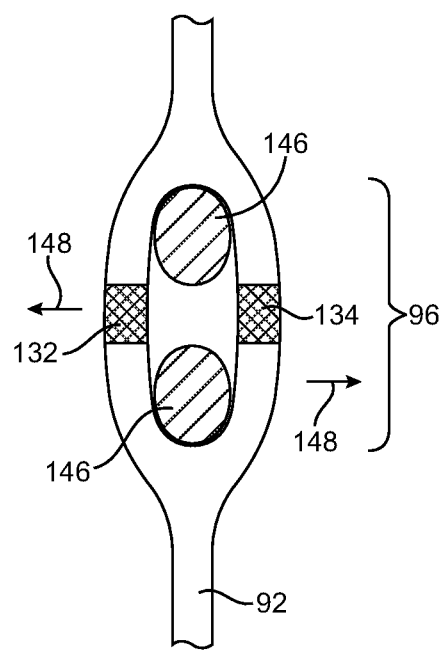
FIG. 23 is a cross-sectional view of an illustrative switch formed from a fiber tube with multiple branches with conductive fibers and insulating branch separator members in accordance with the present invention.

In the example of FIG. 23, switch 96 has been formed from opposing metal conductor portions 132 and 134 (each of which may be connected to a respective cable wire such as wires formed from wire bundles 102 and 104). Cable 92 may have two branches that rejoin each other on either end of switch structure 96. In the center of structure 96, outward biasing members 146 (e.g., air filled balloons or spring-filled members) may be used to bias switch contacts 132 and 134 away from each other in outward directions 148 so that switch 96 is off when not compressed inwardly by a user.

Figure 24:
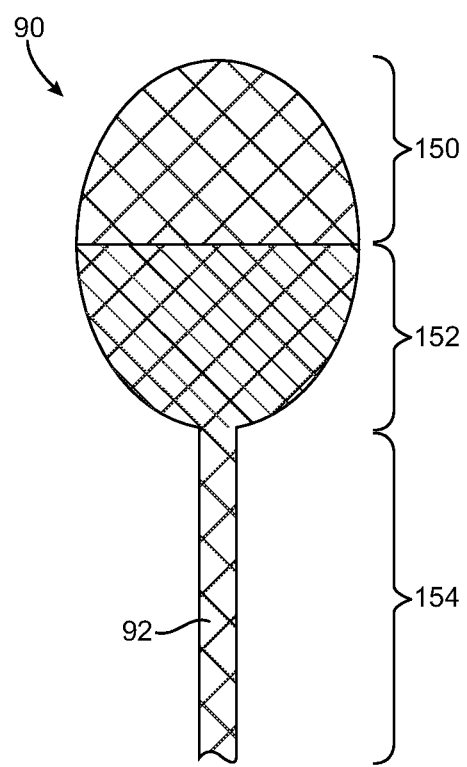
FIG. 24 is a side view of an illustrative fiber earbud structure having portions that are more dense and that pass relatively small amounts of sound and having portions that are less dense and that pass relatively large amounts of sound in accordance with an embodiment of the present invention.

A side view of an illustrative fiber-based earbud and associated cable is shown in FIG. 24. As shown in FIG. 24, earbud 90 may have regions 150 and 152. Region 150 may be more porous than region 152 and may be more (or less) flexible than region 152. The increased porosity of region 150 may make region 150 transparent to audio, so that sound from internal speaker drivers may pass through regions 150 unimpeded. Regions 150 may have fewer and less densely intertwined fibers than region 152 and may incorporate less binder than region 152 or no binder. It may be desirable to make region 152 less porous (e.g., to block sound, to increase rigidity or durability, etc.). Accordingly, more binder may be incorporated into region 152 than in region 150 and/or fibers may be more densely intertwined. In addition to increasing the fiber density and/or binder quantity in region 152, different (e.g., denser, thicker, etc.) fibers may be used in region 152. Cable 92 in region 154 may be formed of flexible fibers (e.g., with little or no binder). If desired, some of cable 92 near region 152 may be provided with stronger fibers, more fibers, more binder for rigidity and strength, etc.

Figure 25:
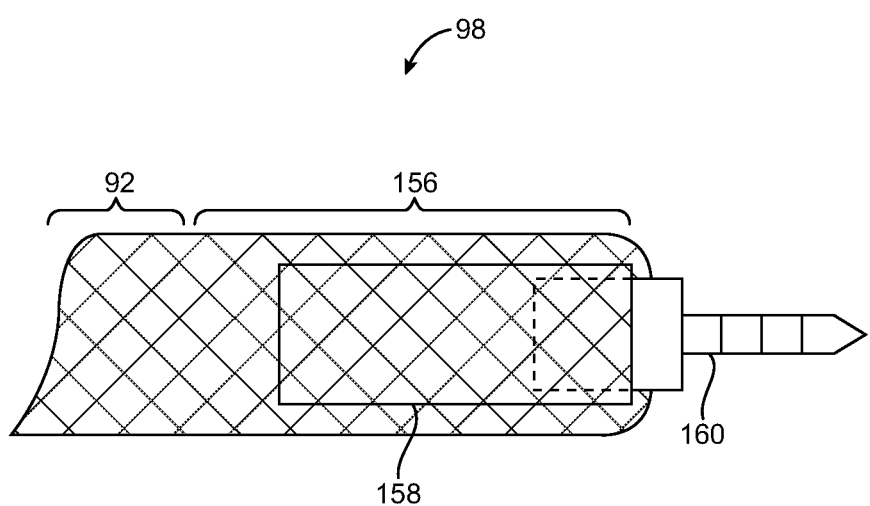
FIG. 25 is a side view of an illustrative audio connector such as a 3.5 mm audio plug showing how different parts of an associated sheath tube may be provided with different amounts of rigidity in accordance with an embodiment of the present invention.

As shown in FIG. 25, audio plug 98 (or other electrical connectors) may be provided with a flexible cable portion 92 and a rigid inner strain relief structure 158. Metal plug structure 160 may be connected to wires within cable 92. In region 156, binder may be incorporated into the fibers of cable 92 to increase strength and rigidity. If desired, cable 92 may also be provided with an increased number of strong fibers in region 156 and/or may be provided with a higher fiber density to further increase strength. These types of structural features may be used for any suitable electrical connector. The use of an audio connector in FIG. 25 is merely an example.

Figure 26:
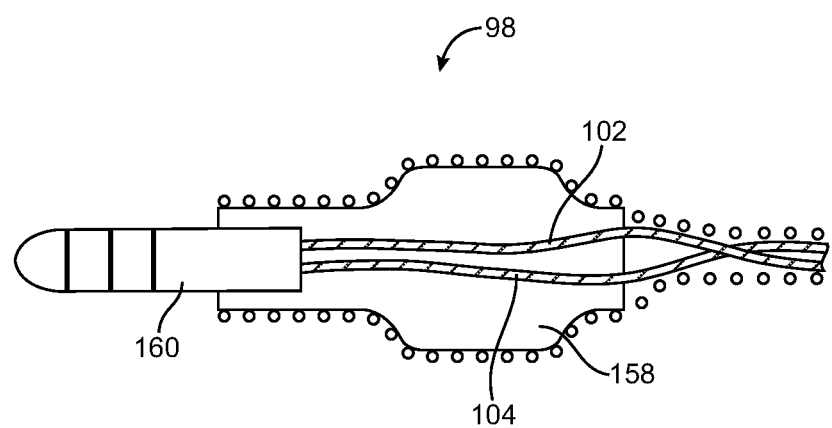
FIG. 26 is a cross-sectional side view of an illustrative audio plug and associated cable sheath that may be formed of intertwined fibers in accordance with an embodiment of the present invention.

FIG. 26 shows how cable 92 may form a conformal sheath over support (strain-relief) structure 158 and wires 102 and 104.

Figure 27:
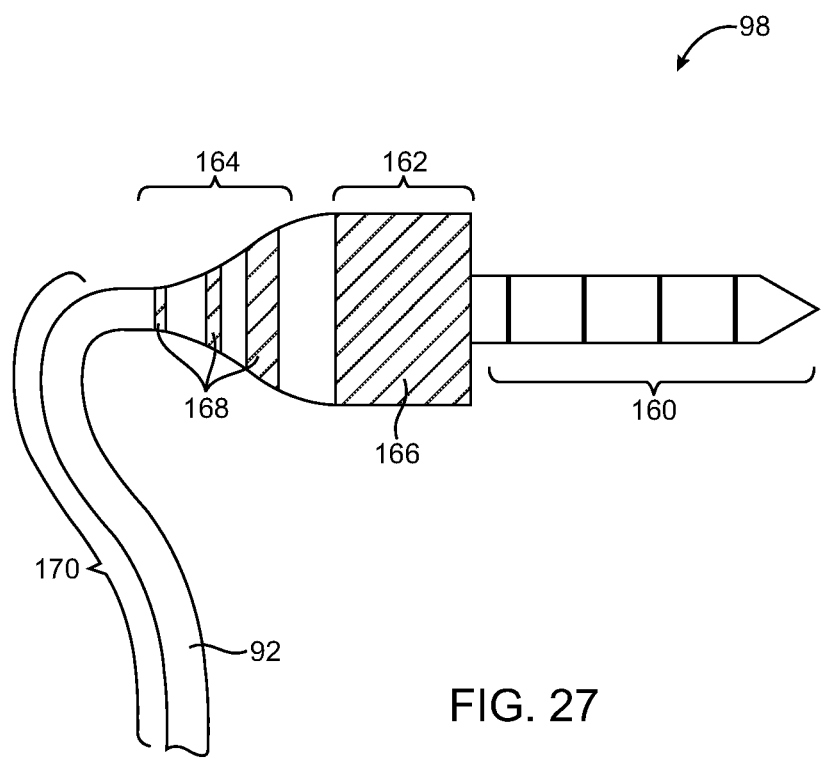
FIG. 27 is a side view of an illustrative audio plug having a fiber cable into which binder has been selectively incorporated to adjust cable flexibility along the length of the cable in accordance with an embodiment of the present invention.

The flexibility of cable 92 can be adjusted along its length by selectively incorporating binder in appropriate areas. This type of arrangement is shown in FIG. 27. In the example of FIG. 27, connector 98 may have a metal multi-contact portion such as portion 160 (e.g., a three-contact or four-contact audio plug). Region 162 of connector 98 may be completely filled with binder. Only some portions (e.g., rings 168) of region 164 are provided with binder (in this example), so cable 92 will be more flexible in region 164 than in region 162. In region 170, there is no binder in the fibers of cable 92, so cable 92 has maximum flexibility in region 170.

Figure 28:
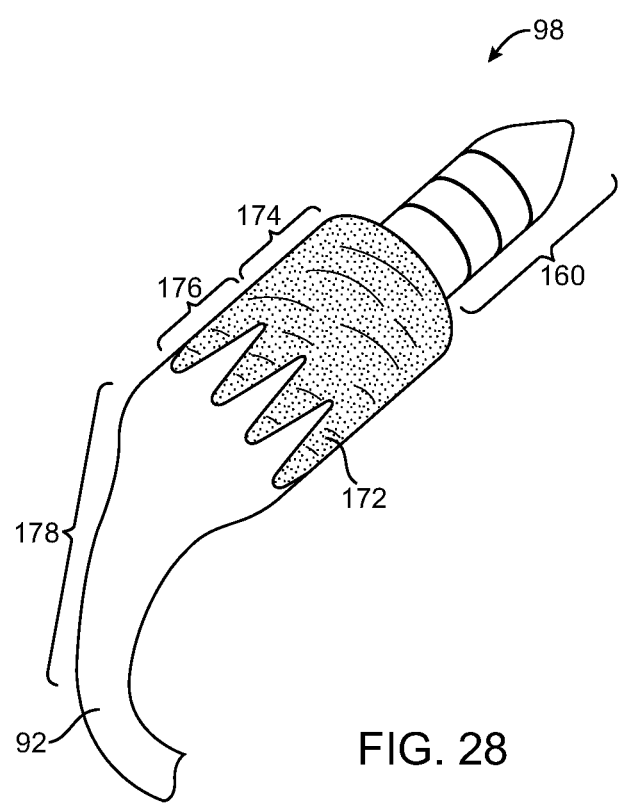
FIG. 28 is a perspective view of an audio plug and fiber cable showing how binder may be incorporated into the cable in a pattern that is radially asymmetric to gradually adjust cable flexibility in accordance with an embodiment of the present invention.

Another suitable arrangement for connector 98 is shown in FIG. 28. In the example of FIG. 28, cable 92 has no binder in region 178 and is therefore flexible in this region. In region 176, a non-radially symmetric pattern of binder 172 is used to provide a decreased flexibility. Region 174 has more binder than region 172 and is therefore rigid and structurally strong. This type of configuration allows the binder pattern in region 176 to serve as a moderate-flex interface between rigid region 174 and flexible region 178.

Figure 29:
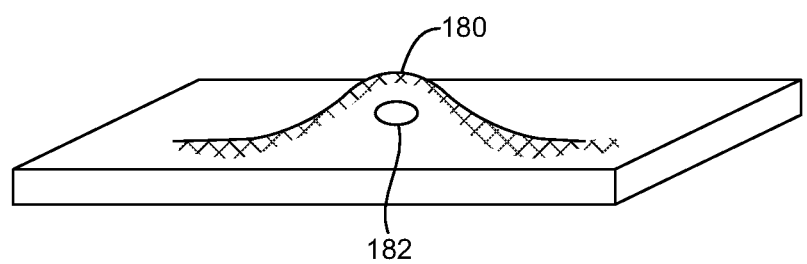
FIG. 29 is a perspective view of an illustrative complex structure of the type that may be formed in an electronic device structure using fiber intertwining and binder incorporation equipment in accordance with an embodiment of the present invention.

FIG. 29 shows how equipment 10 may be used to form complex shapes for part 20 such as hook 180 with hole 182. The fiber in hook 180 may be formed of stronger material than the fiber elsewhere in the structure. Part 20 may be formed as an integral portion of an electronic device housing (as an example)

Figure 30:
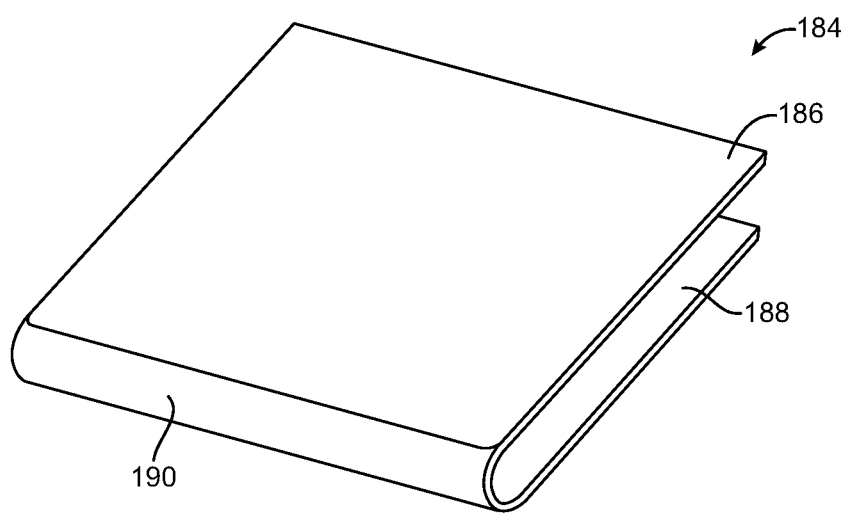
FIG. 30 is a perspective view of a fiber-based structure such as a computer housing or a protective detachable case for an electronic device that may be provided with a flexible hinge portion and rigid upper and lower planar portions in accordance with an embodiment of the present invention.

As shown in FIG. 30, equipment 10 may form structures such as structure 184 that have rigid planar portions such as rigid planar portions 186 and 188 and flexible hinge portions such as flexible hinge 190. This type of arrangement may be provided by incorporating binder into portions 186 and 188, but not into hinge 190. Structure 184 may be used for a portable computer housing, a folio-style case for a detachable electronic device such as a media player or cellular telephone, etc.

Figure 31:
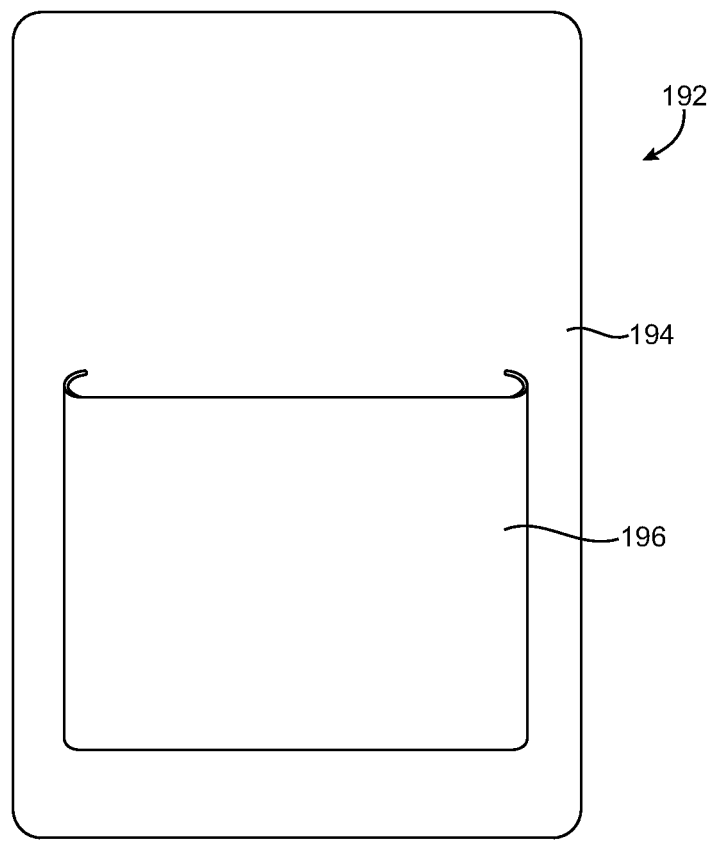
FIG. 31 shows how a fiber-based structure may be provided with a flexible pocket portion and a rigid planar portion in accordance with an embodiment of the present invention.

As shown in FIG. 31, a fiber-based case or other fiber-based structure 192 may be formed from a rigid binder-filled planer portion 194 and a flexible binder-free portion 196. Portion 196 may serve as a flexible pocket that holds a cellular telephone or music player. Portion 194 may be provided with a matching front face if desired.

Some parts that are formed from fiber-based structures may be used for electronic device housings or other applications in which at least a portion of the structure is adjacent to an antenna. In situations such as these, it may be desirable to incorporate one or more antenna windows into the part. For example, in an electronic device housing that is formed from conductive fibers, an antenna window that is transparent to radio-frequency antenna signals can be formed over an antenna within the electronic device housing. The antenna window 30 can be formed by incorporating a solid dielectric window in the housing and by attaching the conductive fibers to the solid window (e.g., using epoxy or other adhesive). Antenna window structures can also be formed by using equipment 10 to form an integral fiber-based antenna window structure within part of the electronic device housing. The antenna window structure may be formed from a fiber that contains primarily polymer, glass, or other dielectric. Because this material is nonconducting, the antenna window structure will be able to pass radio-frequency signals without interference from the fibers in the window.

Figure 32:
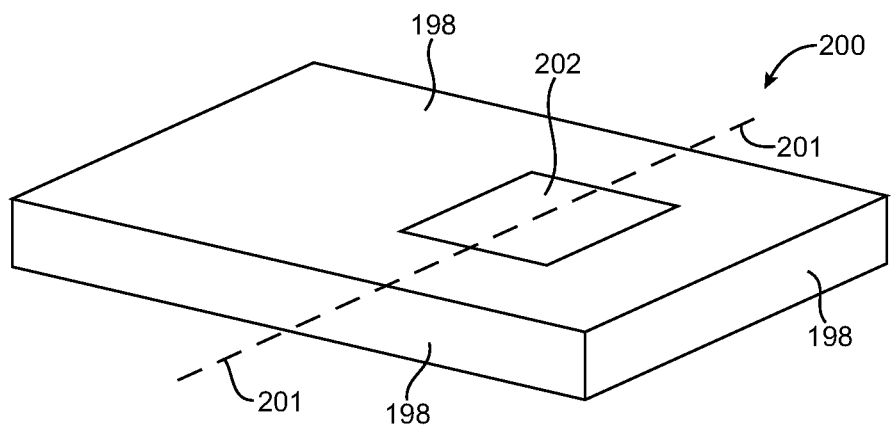
FIG. 32 is a perspective view of an illustrative electronic device having a housing formed of fibers with different properties in different regions to form a radio-frequency (RF) antenna window in accordance with an embodiment of the present invention.

An illustrative fiber-based structure with an antenna window is shown in FIG. 32. Structure 200 of FIG. 32 may be, for example, a housing for an electronic device such as a media player, cellular telephone, portable computer, or other electronic device. Structure 200 may be formed using equipment 10. For example, structure 200 may include corner portions that have compound shapes that have been created using intertwining tool 14 (e.g., 3D knitting equipment). In regions 198, housing walls can be formed from insulating or conductive materials or combinations of insulating and conductive materials (e.g., carbon fibers, polymers, steel filaments, etc.). The materials in regions 198 may include conductors (nondielectrics) and may therefore block radio-frequency wireless signals. Equipment 10 can use dielectric fiber when forming the intertwined fibers of antenna window 202, thereby ensuring that the material in window 202 will be transparent to antenna signals.

Figure 33:
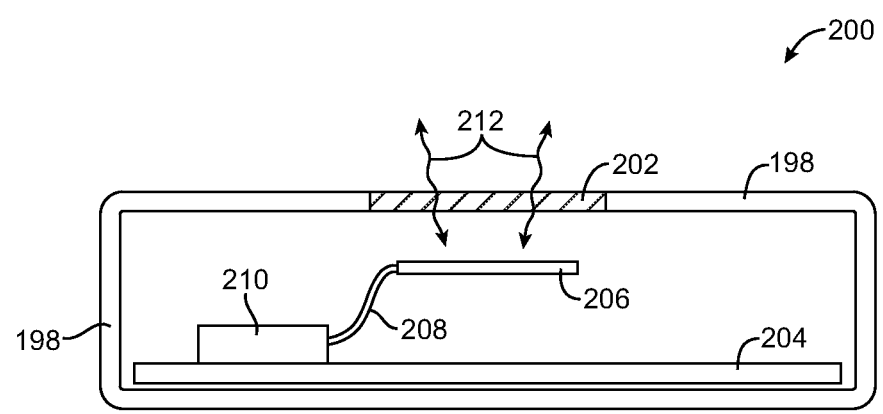
FIG. 33 is a cross-sectional side view of an illustrative electronic device of the type shown in FIG. 32 showing how an antenna and transceiver circuitry may be mounted within the device in accordance with an embodiment of the present invention.

A cross-sectional side view of structure 200 of FIG. 32 taken along line 201 is shown in FIG. 33. As shown in FIG. 33, structure 200 may have housing walls 198 that are formed from intertwined fibers and associated binder. In region 202, an antenna window is formed by using dielectric fibers and binder that are transparent to wireless radio-frequency signals. This allows radio-frequency signals 212 to pass through window 202 during wireless transmission and reception operations with antenna 206. Antenna 206, which may be a single band antenna or a multi-band antenna and which may include one or more individual antenna structures, may be coupled to radio-frequency transceiver circuitry 210 on printed circuit board 204 using transmission line path 208.

Figure 34:
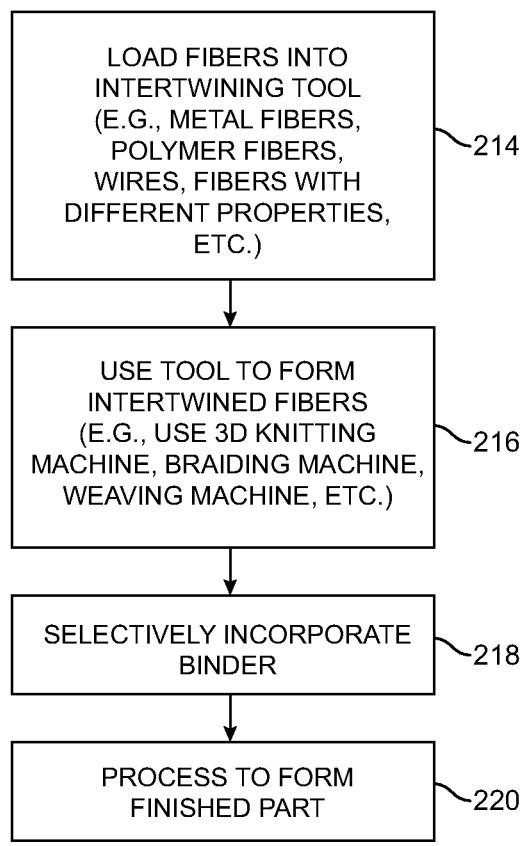
FIG. 34 is a flow chart of illustrative steps involved in forming fiber-based structures with selectively incorporated binder in accordance with embodiments of the present invention.

Illustrative steps involved in forming fiber-based structures using equipment 10 of FIG. 1 are shown in FIG. 34. At step 214, equipment 10 may be provided with one or more different sources of fibers (e.g., fiber sources 12 of FIG. 1). Fibers may be used that provide suitable amounts of strength, stretchability, flexibility, abrasion resistance, insulation, conductivity, color, weight, magnetism, etc. Some of the fibers may be formed from metals such as ferrous metals. Other fibers may be formed from polymers or glasses. There may be one, two, three, or more than three different types of fiber sources available to a given intertwining tool 14. Each fiber may have a different property and may be incorporated into a workpiece in an accurately controlled percentage. This allows tools 14 to form structures that have portions with different properties.

At step 216, tools 14 may be used to form fiber-based structures of appropriate shapes and sizes. Different types of tools may be used for different types of operations. For example, a computer-controlled braiding machine may be used to form a continuous or semi-continuous fiber-based tube for a headset cable sheath, a weaving tool may be used to form housing sidewalls for a portable computer with an integral antenna window or a flexible hinge portion, and a 3D knitting tool may be used to form housing shapes with compound curves for a cosmetic or structural housing surface. These tools may each be used to form separate parts that are assembled together by hand or by automated assembly tools or may be used to form unitary structures that are complete without the addition of further fiber-based parts.

During the operations of step 218, matrix incorporation equipment 16 may be used to selectively incorporate binder into the intertwined fibers that were produced during the operations of step 214. Binder may be incorporated in patterns that provide controlled amounts of flexibility. For example, binder patterns may include rings of the same shape or different shapes (e.g., rings of varying width of other patterns that provide a smooth transition in the amount flexibility at various points along the length of a tube or other elongated structure). Binder patterns may also include solid regions (e.g., for forming rigid planar structures such as housing walls for a portable computer, handheld electronic device, or other structure). Other regions of a structure may be provided with little or no binder (e.g., in a hinge structure, cable, or pocket where maximum flexibility is desired or in an earbud speaker port or computer housing speaker port where audio transparency is desired).

After incorporating desired patterns of binder into the intertwined fiber structures, additional processing steps may be performed during the operations of step 220. These operations may include, for example, assembling a headset by cutting headset parts from a continuous stream of parts, adding a cosmetic cover to a structural housing member, using adhesive or other fasteners to connect separate fiber-based structures to each other or to parts that do not include fibers, etc.

If desired, the steps of FIG. 34 may be repeated and/or performed in different orders. For example, it may be desirable to assemble two or more intertwined fiber parts before matrix incorporation operations are performed at step 218. It may also be desirable to build up complex structures by using a series of incremental operations. During each such incremental step, a layer of fiber-based material may be added to a workpiece and additional binder may be incorporated and cured. An incremental approach such as this may be used for part of a fiber-based structure while other parts of the structure are formed using a single intertwining operation and a single binder incorporation operation (as examples).

The fibers that are used for constructing fiber-based cables and other fiber-based structures may be formed from materials such as nylon, polyester, polypropylene, para-aramid (long-chain polyamide) synthetic fibers such as KEVLAR® fiber, other polymers, glass, metals such as steel, or other suitable material. If desired, fibers may be formed from a super-elastic shape memory alloy such as nickel titanium (sometimes referred to as nitinol). Combinations of these materials may also be used.

Fiber materials may be chosen so as to provide device housings, cables, and other structures that are formed from intertwined fibers with desired properties. For example, materials may be selected that are strong, exhibit good abrasion resistance, and are not difficult to color (e.g., by incorporating pigments). It may be desirable to choose materials based on their conductive (or non-conductive) or magnetic properties. It may also be desirable to use cost-effective materials. Materials such as nylon (polyamides) and polyester may be receptive to coloring additives. A material such as a para-aramid synthetic polymer may be strong, but may exhibit relatively poor abrasion resistance. It may therefore be desirable to incorporate para-aramid synthetic fibers into cables that also incorporate other fibers (e.g., fibers with good abrasion resistance such as an appropriate nylon). A fiber-based cable formed from a material such as steel may exhibit magnetic properties. For example, a steel-based cable may be magnetized. Magnetized cables may be magnetically attracted to themselves, thereby facilitating cable management. Magnetic cables may also be held in place using magnets (e.g., when the cables are being stored between uses). Fiber-based cables and other structure may be provided with these magnetic properties by incorporating steel fibers into at least part of the structures. It may be desirable to form individual fibers from a composite of materials to take advantage of the properties of different materials. Fibers may also be formed from multiple filaments.

Figure 35A:
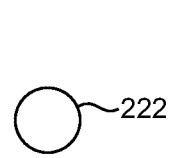
FIG. 35A is a cross-sectional view of an illustrative monofilament fiber that may be used in forming fiber-based structures in accordance with an embodiment of the present invention.

An illustrative fiber that is formed from single filament (i.e., a monofilament fiber structure) is shown in FIG. 35A. In particular, FIG. 35A shows a cross-sectional view of monofilament fiber 222. Fiber 222 may be, for example, a monofilament of nylon or other suitable material. Fiber 222 may have any suitable diameter (e.g., 0.5 mm or less, 0.2 mm or less, 0.1 mm or less, 0.05 mm or less, 0.02 mm or less, 0.01 mm or less, etc.).

Figure 35B:
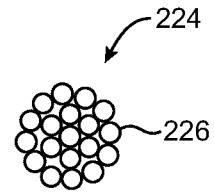
FIG. 35B is a cross-sectional view of an illustrative multifilament fiber that may be used in forming fiber-based structures in accordance with an embodiment of the present invention.

A cross-sectional view of an illustrative fiber that is formed from multiple filaments is shown in FIG. 35B. As shown in FIG. 35B, multifilament fiber 224 may be formed from numerous individual filaments 226. Filaments 226 may be, for example, formed from nylon, polyester, or other suitable materials. Filaments 226 may be intertwined using intertwining tool 14 (FIG. 1) or other suitable equipment to form fiber 224.

Figure 35C:
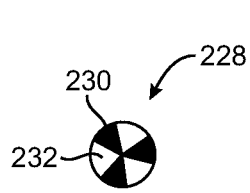
FIG. 35C is a cross-sectional view of an illustrative monofilament fiber formed from a composite structure containing multiple materials that may be used in forming fiber-based structures in accordance with an embodiment of the present invention.

FIG. 35C shows a cross-sectional view of a monofilament fiber (fiber 228) that is formed from a composite of different materials. Composite fiber 228 is formed from materials that remain distinct within fiber 228 so that some parts of fiber 228 are predominantly formed from a certain material, whereas other parts of fiber 228 are predominantly formed from another material. In the example of FIG. 35C, fiber 228 is shown as having two distinct materials 230 and 232. In general, fiber 228 may be formed of any number of distinct materials (e.g. three or more different materials, four or more materials, etc.). If desired, each of the materials 230 and 232 may be in itself be formed from a mixture of materials. Fiber 228 is shown segmented radially in the illustrative cross-section of FIG. 35C. In general, fiber 228 may be divided into multiple different materials in any suitable fashion. For example, different materials may be formed in radially symmetric coatings (i.e., different layers).

Figure 35D:
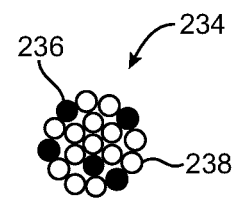
FIG. 35D is a cross-sectional view of an illustrative multifilament fiber having filaments formed from different types of materials that may be used in forming fiber-based structures in accordance with an embodiment of the present invention.

FIG. 35D shows a cross-sectional view of a multifilament fiber (fiber 234) that has filaments 236 and 238 that are formed from different materials. Fiber 234 may have any suitable proportion of filaments 236 and 238. Fiber 234 is shown as having two types of filaments, although, in general, fiber 234 may have any number of types of filaments. Filaments 236 and 238 may be intertwined using intertwining tool 14 or other suitable equipment.

Figure 35E:
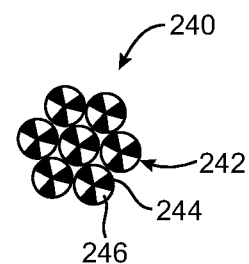
FIG. 35E is a cross-sectional view of an illustrative multifilament fiber formed of composite fibers in accordance with embodiments of the present invention.

Another illustrative arrangement that may be used for forming a multifilament fiber is shown in the cross-sectional view of FIG. 35E. As shown in FIG. 35E, multifilament fiber 240 may have filaments 242 that are formed from a composite of materials. In the FIG. 35E example, each filament 242 is shown having radial segments of materials 244 and 246. In general, filament 242 may be formed of any number of distinct materials and filament 242 may be segmented in any suitable manner. Fiber 240 of FIG. 35E is shown as having only one type of composite filament 242. If desired, fiber 242 may be formed of any number of types of composite filaments or may be formed of a mixture of composite filaments and unitary-material filaments (i.e., filaments that are not formed from a composite of multiple materials). Filaments 242 may be wound together like yarn to form fiber 240 using intertwining tool 14 or other suitable equipment.

Figure 36A:
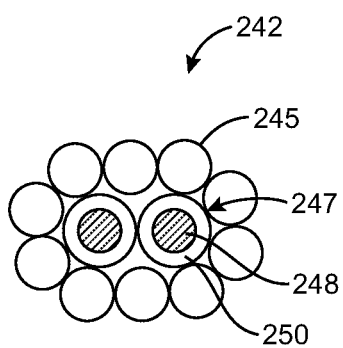
FIG. 36A is a cross-sectional view of a fiber-based cable containing insulated wires and monofilament fibers in accordance with an embodiment of the present invention.
Figure 36B:
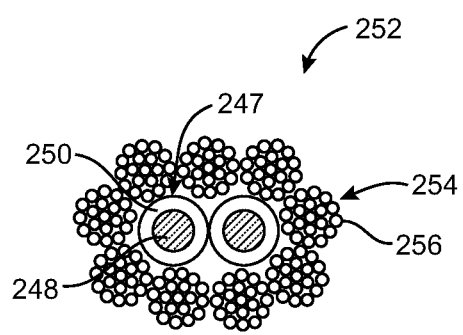
FIG. 36B is a cross-sectional view of a fiber-based cable containing insulated wires and multifilament fibers in accordance with an embodiment of the present invention.

Fiber-based cables may contain insulated wires. An arrangement of this type is shown in the examples of FIGS. 36A and 36B. FIG. 36A shows a cross-sectional view of a fiber-based sheath formed from intertwined monofilament fibers 245. Fibers 245 may be intertwined in any suitable fashion and may be formed in one or more layers. For example, fibers 245 may be woven such that some fibers 245 form a warp and other fibers 245 form a weft. Fibers 245 may be knitted such that fibers 245 form interlocking loops. Fibers 245 may also be braided. One or more insulated wires 247 may lie inside cable 242. Each insulated wire 247 may have a conductive center 248 and a layer of insulation such as insulation 250. Conductive center 248 may be formed from copper or other suitable conductive material. Insulation 250 may be formed from plastic (as an example). Cable 242 is shown has having two insulated wires 247 in the example of FIG. 36A. In general, cable 242 may have any suitable number of insulated wires 247. In FIG. 36A, insulated wires 247 are shown as being surrounded by one layer of fibers 245. In general, insulated wires 247 may be surrounded by any suitable number of fiber layers.

FIG. 36B shows a cross-sectional view of a fiber-based cable 252 that has a fiber-based sheath formed from multi-filament fibers 254. Each fiber 254 may have many filaments 256. Fibers 254 may be woven, knitted, braided, or otherwise intertwined using intertwining tool 14 or other suitable equipment. Cable 252 may have insulated wires 247 that each have a conductive center 248 surrounded by insulation 250. Cable 252 of FIG. 36B is shown as having two insulated wires 247. If desired, cable 252 may have a different number of insulated wires 247 (e.g., three or more wires 247, etc.). Cable 252 has a fiber-based sheath that is formed from one layer of multifilament fibers 254 although in general cable 252 may have a fiber-based sheath that has any suitable thickness and any number of layers of 252. Cable 252 may have a fiber-based sheath that is formed from a mixture of monofilament and multifilament fibers. Cable 252 may have a fiber-based sheath that has fibers of different materials or fibers formed from composite materials.

Figure 37:
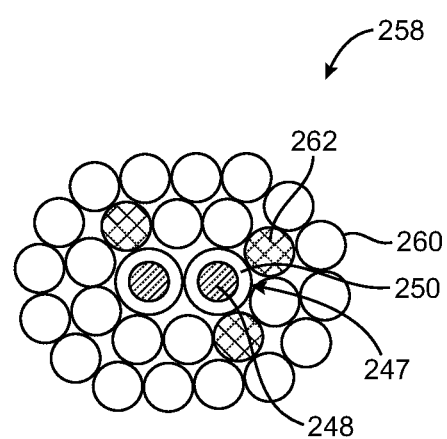
FIG. 37 is a cross-sectional view of a fiber-based cable containing insulated wires and more than one type of fiber in accordance with an embodiment of the present invention.

FIG. 37 is a cross-sectional view of a fiber-based cable 258 that is formed from two types of fibers. Cable 258 has fibers 260 that may be, for example, nylon or another polymer. Fibers 262 may be a different material such as para-aramid, glass, steel, or other suitable material. Fibers 262 that are formed from strong materials such as para-aramid materials may add strength to cable 258. Fibers 262 that formed from magnetic materials such as steel may add magnetic properties to cable 258.

Fibers 262 may be monofilament or multifilament fibers. Fibers 262 may also be formed from composite materials. Fibers 260 and 262 may be woven, knitted, braided, or intertwined in any other suitable fashion. The fiber-based sheath of cable 258 is shown as having a thickness of two fibers. In general, fiber-based sheaths for cables may have any suitable thicknesses. Fibers 262 are shown in FIG. 37 as being part of an inner layer of cable 258, but if desired, fibers 262 may also be formed as part of the outermost surface of cable 258. Cable 258 is shown as having two insulated wires 247 each having conductive center 248 and insulation 250. This is merely illustrative. Fiber-based cables such as cable 258 may have any suitable number of insulated wires 247.

Figure 38:
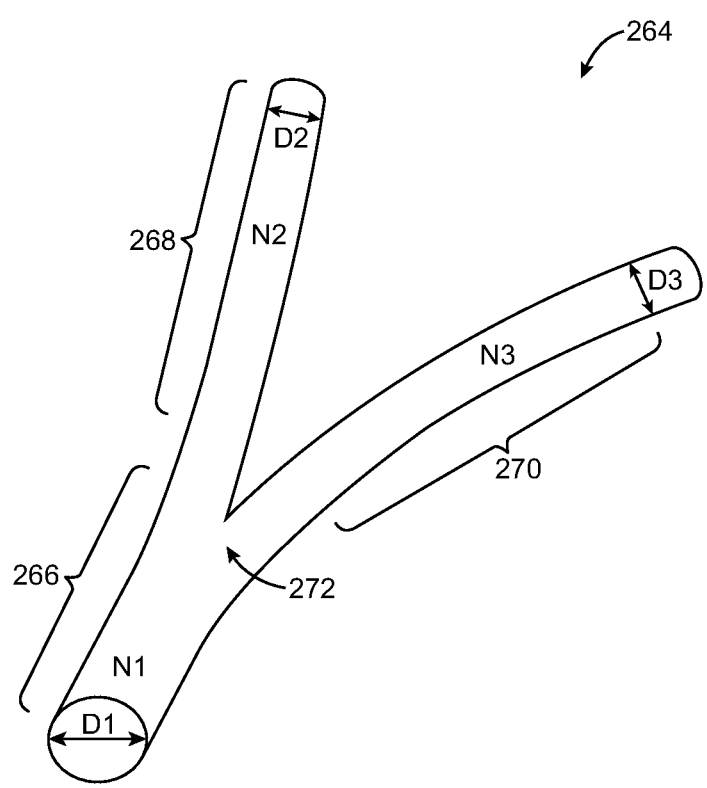
FIG. 38 is a perspective view of a tube-shaped bifurcated fiber-based cable in accordance with an embodiment of the present invention.

A seamless Y-junction (sometimes referred to as a bifurcation) may be formed in an accessory cable by forming the cable with intertwining tool 14. As shown in FIG. 38, for example, cable 264 may be formed with a seamless Y-junction such as junction 272. Fiber-based cable 264 in the example of FIG. 38 has a round profile, so cable 264 has a cylindrical tube shape. Below Y-junction 272 (i.e., at the proximal end of a headset, near its audio plug), cable 264 has only one branch 266. Branch 266 may have a diameter D1. After the Y-junction (i.e., at the distal end of the headset near its speakers), cable 264 may have two branches 268 and 270. Branch 268 may have a diameter D2 and branch 270 may have a diameter D3. Each of the diameters D2 and D3 may be less than diameter D1 of branch 266 or may be equal or greater than the diameter D1 of branch 266. Diameters D2 and D3 may, if desired, be equal.

In a typical arrangement, fiber-based cable 264 has fibers that are intertwined so that the number of fibers that are present at one end of the cable is substantially same as the number of fibers that are present at another end of the cable. For example, branch 266 may contain N1 fibers (i.e., N1 fibers would pass through a cross-section of branch 266). Similarly, branch 268 may contain N2 fibers and branch 270 may contain N3 fibers. The fibers of cable 264 may be intertwined in such a way that the number of fibers that are present before the Y-junction is the same as the number of fibers after the Y-junction, i.e., N1=N2+N3. Each of the fibers in branches 268 and 270 in this type of arrangement passes through Y-junction 272 to branch 266. Each fiber that has one end in branch 266 has another end in either branch 268 or branch 270. In arrangements in which electrically insulated wires are contained in the structure, these wires typically pass uninterrupted from branch 266 to branches 268 and 270, even if all of the wires are not needed at the distal ends of branches 268 and 270. This is because intertwining tool 14 typically does not interrupt delivery of particular wires to the cable during the cable formation process (i.e., the cable formation process is substantially continuous as described in connection with the example of FIG. 20).

The fibers of cable 264 may form a sheath. Insulated wires may be contained in the sheath. The number of insulated wires in branch 266 may be equal to the number of wires in branch 268 plus the number of wires in branch 270. Each wire that has one end in branch 266 may have another end in either branch 268 or branch 270. If cable 264 is a headphone cable, four wires may be present in branch 266, with two of the wires continuing into branch 268 and the other two wires continuing into branch 270. Cables for accessories with additional electronic components such as button assemblies and microphones may have more insulated wires (e.g., another two or four wires that extend from branch 266 to branch 268).

A fiber-based cable may also have a flat, ribbon-like profile. This type of fiber-based cable is shown as cable 274 in FIG. 39A. Cable 274 may have a rectangular or oblong cross-section. A Y-junction such as junction 276 may be formed in cable 274. At one side of Y-junction 276 (i.e., at the proximal end of a headset or other accessory), cable 274 may have one branch 278. At another side of Y-junction 276 (i.e., at the distal end of a headset or other accessory), cable 274 may have two branches 280 and 282. The same number of fibers may be present before and after the Y-junction, e.g., the number of fibers in branch 278 may be equal to the number of fibers in branches 280 and 282. Each of branches 280 and 282 may be thinner or have a smaller cross-section than single branch 278.

Figures 39A, 39B:
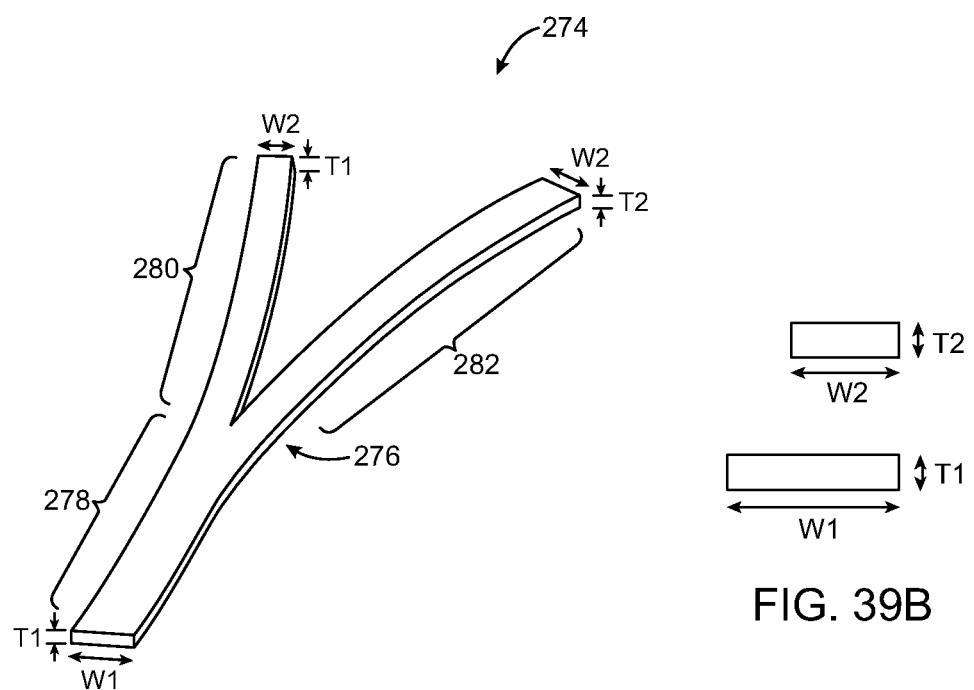
FIG. 39A is a perspective view of a ribbon-shaped fiber-based cable having a converging bifurcation in accordance with an embodiment of the present invention.
FIG. 39B shows cross-sectional side views of a cable in accordance with an embodiment of the present invention.

Y-junctions such as Y-junction 276 of FIG. 39A may sometimes be referred to as converging Y-junctions. Single branch 278 may have a width W1 and a thickness T1. At the other side of Y-junction 276, branches 280 and 282 may each have a width W2 and a thickness T2. The thickness of cable 274 may be substantially the same before and after the Y-junction, so that T1=T2, as shown in FIG. 39B. Single branch 278 may have a width W1 that is approximately twice the widths W2 of branches 280 and 282 (as an example). For example, branch 278 may have a width W1 of 2 millimeters and a thickness T1 of 0.5 mm. Branches 280 and 282 may each have a width W2 of 1 millimeter and a thickness T2 of 0.5 millimeters. These dimensions are merely illustrative. In general, cable 274 may have any suitable dimensions. In the example of FIG. 39A, branches 280 and 282 are shown as having the same cross-sectional dimensions, but, if desired, branches 280 and 282 may have different cross-sectional dimensions.

Figure 40:
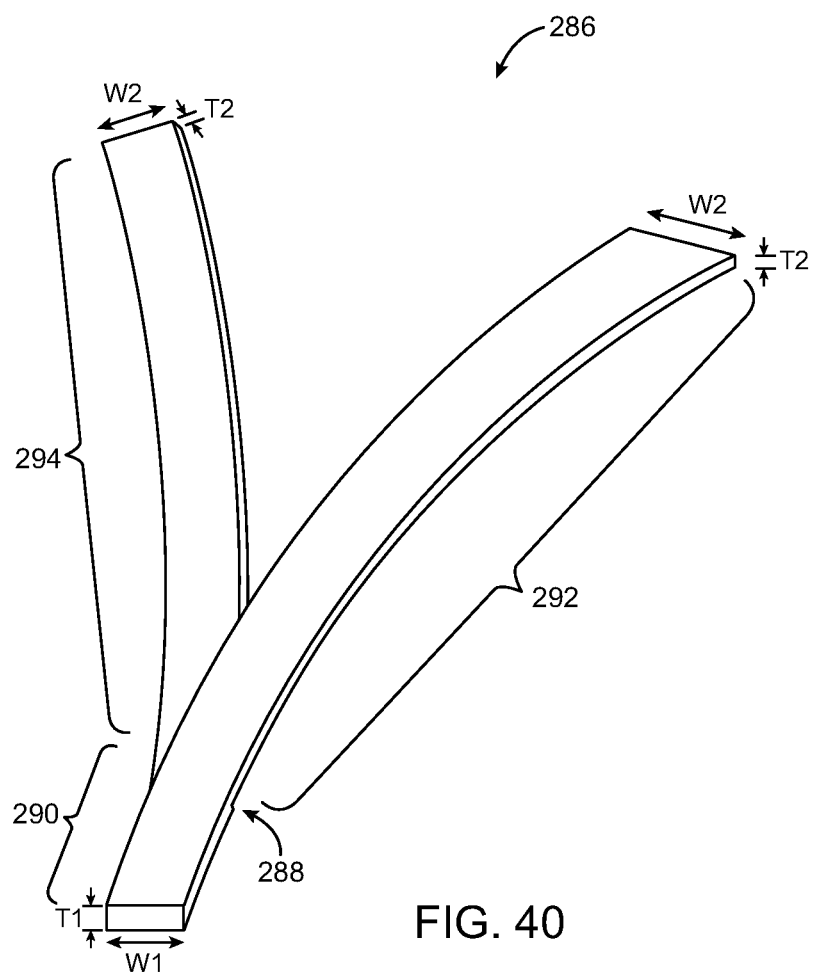
FIG. 40 is a perspective view of a ribbon-shaped fiber-based cable having an overlapping bifurcation in accordance with an embodiment of the present invention.

A fiber-based cable with a ribbon-like profile may also have an overlapping Y-junction, as shown in FIG. 40. Fiber-based cable 286 in FIG. 40 has one branch 290 on one side of Y-junction 288 (i.e., at the proximal end of a pair of headphones) and two branches 292 and 294 on another side of Y-junction 288 (i.e., at the distal end of the headphones). Branches 292 and 294 may overlap slightly before uniting at Y-junction 288. Ribbon-like cable 286 may have a rectangular or oblong cross-section. Single branch 290 may have a width W1 that is greater than a thickness T1. Branches 292 and 294 may have widths W2 that are greater than thicknesses T2. Single branch 290 may have a width W1 that is the approximately the same as widths W2 of branches 292 and 294. Single branch 290 may have a thickness T1 that is approximately twice the thickness T2 of branches 292 and 294. For example, single branch 290 may have a width of 1.5 millimeters and a thickness of 1.0 millimeters. Branches 292 and 294 may each have widths W2 of 1.5 millimeters and thicknesses T2 of 1.0 millimeters. These dimensions are merely illustrative. In general, branches 292 and 294 need not have the same dimensions, and the thickness of single branch 290 need not be twice the thicknesses of branches 292 and 294. Overlapping Y-junction 288 may be a seamless Y-junction. Fibers may run seamlessly along the length of cable 286. Fibers that are in single branch 290 may pass through Y-junction 299 and into one of either branches 292 and 294. The number of fibers that are present in single branch 290 may be the sum of the number of fibers in branches 292 and 294.

Figure 41A:
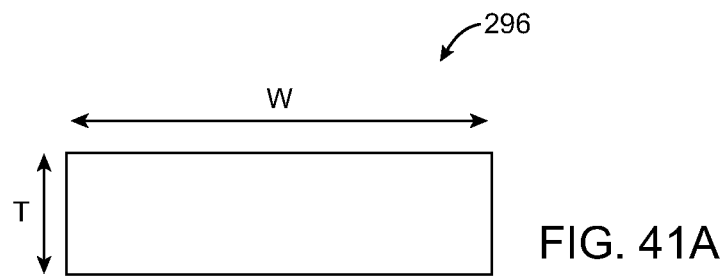
FIG. 41A is a cross-sectional view of an illustrative ribbon-shaped fiber-based cable having a rectangular profile in accordance with an embodiment of the present invention.
Figure 41B:
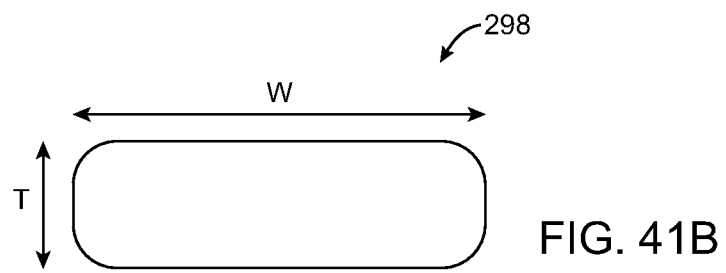
FIG. 41B is a cross-sectional view of an illustrative ribbon-shaped fiber-based cable having a rectangular profile with rounded corners in accordance with an embodiment of the present invention.
Figure 41C:
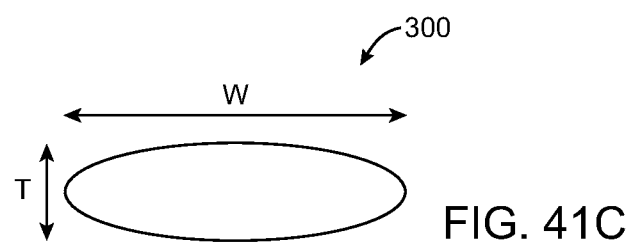
FIG. 41C is a cross-sectional view of an illustrative ribbon-shaped fiber-based cable having a flattened oval profile in accordance with an embodiment of the present invention.
Figure 41D:
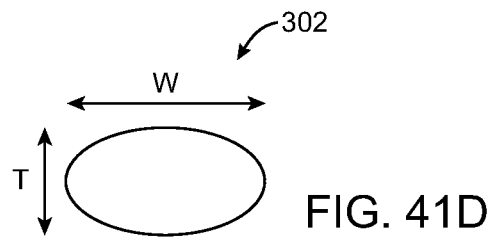
FIG. 41D is a cross-sectional view of an illustrative ribbon-shaped fiber-based cable having an oval profile in accordance with an embodiment of the present invention.

The ribbon-shaped cables of FIGS. 39 and 40 may have rectangular, oblong, or oval profiles. Examples of ribbon-shaped cables are shown in the cross-sectional view of FIGS. 41A-41D. Each of the fiber-based cables of FIG. 41A-41D has a width W that is greater than a thickness T. Cable 296 in FIG. 41A has a cross-section that is substantially rectangular with sharp corners. Cable 298 in FIG. 41B has a cross-section that is substantially rectangular with rounded corners. Cable 298 may be said to have an oblong-shaped cross-section. Cable 300 in FIG. 41C has a flattened oval-shaped cross-section. The cross-section of cable 302 in FIG. 41D is an oval that is rounder than that of cable 300 in FIG. 41C.

Figure 42:
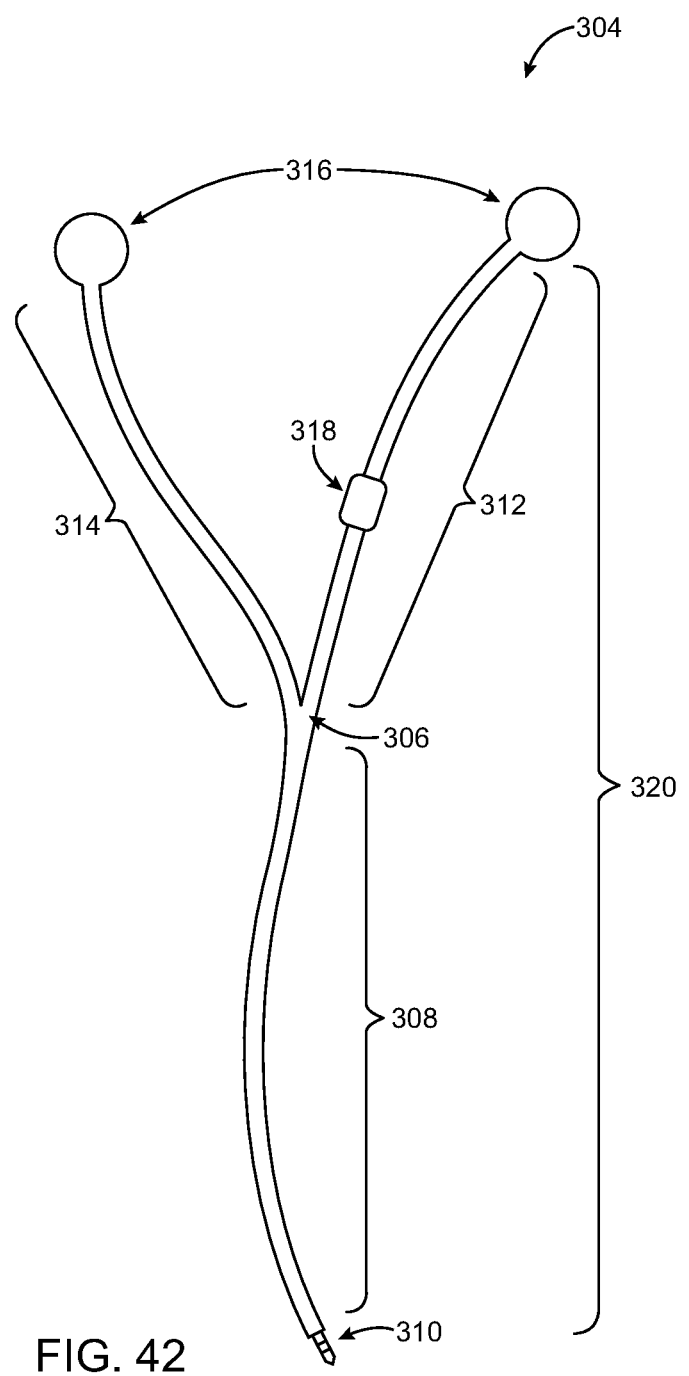
FIG. 42 is a perspective view of an illustrative headset formed from fiber-based cables that has a switch located on one arm in accordance with an embodiment of the present invention.

Headphones 304 in FIG. 42 may have a fiber-based cable such as cable 320 with a seamless Y-junction such as Y-junction 306. One side of Y-junction 306 may have a single branch 308 leading to an audio connector 310 at the proximal end of cable 320. Another side of Y-junction 306 may have two branches 312 and 314, each leading to an earbud 316 at the distal portion of cable 320. Branch 312 may have a user interface such as a button assembly or other suitable input-output component. The input-output component may include one or more microphones, status indicators, buttons, switches, etc. With one suitable arrangement, which is sometimes described herein as an example, branch 312 may be provided with a button controller assembly such as switch-based controller 318. A user may use controller 318 to transmit information to an electronic device that is connected to audio connector 310. For example, a user may actuate one of several different button-based switches (e.g., a rewind or back button, a stoop or pause button, a forward or play button, etc.). A microphone in controller 318 may be used to gather a user's voice (e.g., to serve as a voice microphone during a telephone call). Headphones 304 may also incorporate a microphone that is located at a location that is remote from controller 318.

Fiber-base cable 320 of FIG. 42 may have a fiber-based sheath that surrounds insulated conductive wires. Headphones 304 may have wires that connect contacts (terminals) in audio connector 310 to each earbud 316 to provide audio for a user. Headphones 304 may have, for example, two wires that run from audio connector 310 to each earbud 316. One of the wires of each pair of wires may serve as a common ground. The other wire in each pair may serve as either a left audio wire or a right audio wire, respectively. Additional wires may run from audio connector 310 to controller 318 to provide button and optional microphone functionality. For example, two insulated wires, or a two-conductor coaxial cable, may be used to convey signals to and from controller 318. If a microphone is incorporated into headphones 304 (e.g., in connection with additional circuitry in controller 318), there may be additional conductive wires that transmit signals from the microphone to connector 310. If desired, the conductive wires may be intertwined with the fibers of fiber-based headphones 304.

When cable 320 is formed using a continuous process of the type described in connection with FIG. 20, the same number of fibers may be present at each end of cable 320. The number of fibers in branch 308 may be the sum of the number of fibers in branches 312 and 314. The same number of insulated wires may also be present at each end of cable 320. For example, if six insulated wires are present in branch 308, then two insulated wires may be present in branch 314 and four insulated wires may be present along the entire length of branch 312. Wires that connect connector 310 with controller 318 may continue upward on branch 312 to earbud 316, even though these wires are not needed to convey signals between controller 318 and additional components in the vicinity of earbud 316.

Conductive wires in a fiber-based cable need not be contained within a fiber-based sheath. Conductive wires may, for example, be intertwined directly with other fibers. If desired, the relative position of the conductive wires among the other fibers in the cable may be varied by intertwining tool 14 as a function of position along the length of the cable. For example, the conductive wires may be located in the central core of the cable at some locations along the cable and may be located on the surface of the cable at other locations along the cable. An arrangement of this type may be to connect contacts in audio connector 310 to circuitry in controller 318.

An illustrative arrangement in which intertwining tool 14 adjusts the relative position of insulated wires within a fiber-based cable to allow the wires to be interconnected to circuitry in controller 318 is illustrated in the examples of FIGS. 43A-43D.

Figure 43A:
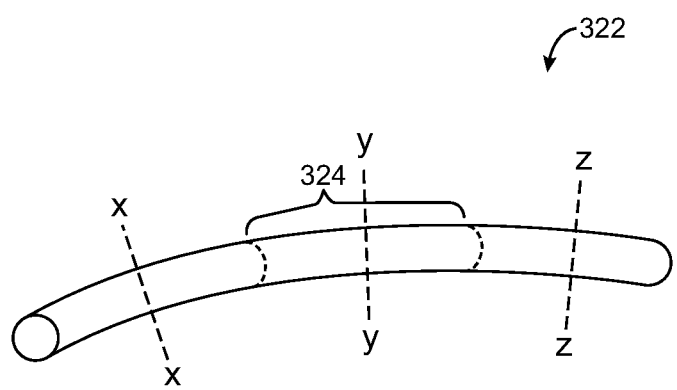
FIG. 43A is a perspective view of a segment of an illustrative fiber-based cable that may be used in an accessory in accordance with an embodiment of the present invention.
Figure 43B:
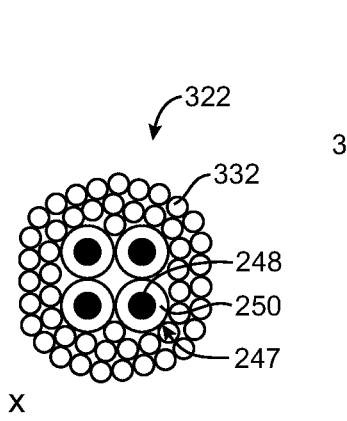
FIG. 43B is a cross-sectional view of an illustrative fiber-based cable showing how conductive wires may be located in the central core of the cable in portions of the cable such as at cross-sectional line X-X of FIG. 43A in accordance with an embodiment of the present invention.
Figure 43C:
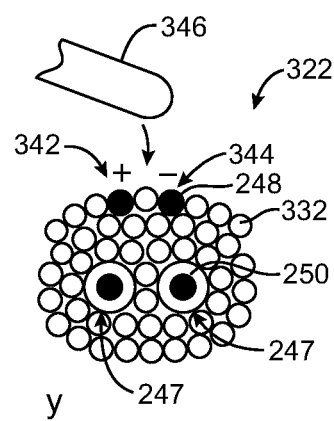
FIG. 43C is a cross-sectional view of an illustrative fiber-based cable showing how conductive wires may be selectively brought to the surface of the cable to form part of a switch structure in accordance with an embodiment of the present invention.
Figure 43D:
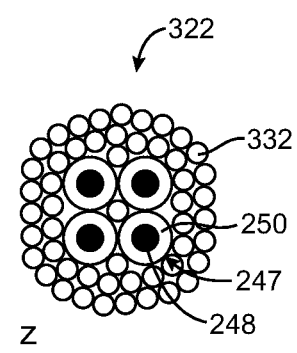
FIG. 43D is a cross-sectional view of an illustrative fiber-based cable showing how conductive wires may be located in the central core of the cable in portions of the cable such as at cross-sectional line Z-Z of FIG. 43A in accordance with an embodiment of the present invention.

A perspective view of a segment of fiber-based cable 322 is shown in FIG. 43A. Section 324 may be a region of cable 322 that forms terminals for an integral switch. In this type of arrangement, a switch may be formed from a pair of exposed wires, so it is not necessary to include circuitry for implementing a more complex multi-function button controller for the headset. FIG. 43B-43D are cross-sectional views of cable 322 taken along lines X-X, Y-Y, and Z-Z of cable 322.

FIG. 43B is a cross-sectional view of cable 322 at location X, which is on one side of switch region 324. Cable 322 of FIG. 43B has intertwined fibers 332. Fibers 332 may be monofilament or multifilament fibers. Fibers 332 may be arranged in a sheath around insulated conductive wires 247. Fibers 332 are shown in FIG. 43B as being arranged in a sheath with a thickness of two fiber layers. In general, fiber sheaths may have any suitable thickness. Each insulated wire 247 has insulation 250 surrounding a conductive center such as center 248. Four insulated wires 247 are shown in FIG. 43B. In general, cable 322 may have any suitable number of insulated wires. Insulated wires 247 may be provided as individual wires, as twisted pairs, as parts of coaxial cables, etc.

FIG. 43C is a cross-sectional view through line Y-Y of cable 322. In FIG. 43C, two of the wires 247 have been placed at the surface of cable 322 by intertwining tool 14 and have been stripped of their insulation to form terminals 342 and 344. Two other wires 247 remain embedded in intertwined fibers 332.

During the fabrication of cable 322, intertwining machinery may be used to ensure that the insulated wires are contained within the core region of the cable (as in locations X and Z of cable segment 322 of FIG. 43A) in regions outside of switch region 324. This helps protect the wires from damages (e.g., from scratches). The intertwining tool may selectively bring the insulated wires to the surface of cable 322 at desired locations such as location Y in FIG. 43C. After (or before) fiber-based cable 322 has been formed, insulated wires 247 may be selectively stripped of their insulations 250 at locations such as location Y, leaving their conductive centers 248 exposed on the surface of the cable. Terminals 342 and 344 may form a switch 324. Such a switch 324 may be shorted together when touched by a user. For example, terminals 342 and 344 may be electrically connected to each other by the skin on a user's finger (finger 346) when the user's finger bridges terminals 342 and 344. Terminals 342 and 344 may also be bridged by a mechanical lever or other switching mechanism.

FIG. 43D is a cross-sectional view through fiber-based cable 322 at location Z. At location Z, insulated wires conductive wires 247 lie within fibers 332 and insulation 250 is unstripped. Fibers 332 may form a fiber-based sheath surrounding insulated wires 247 or fibers 332 may be intertwined with insulated wires 247.

Figure 44A:
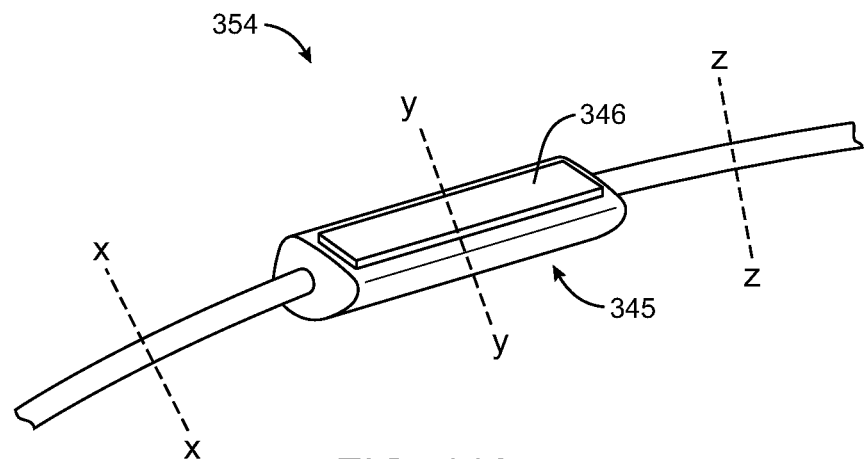
FIG. 44A is a perspective view of a portion of a fiber-based cable having a button assembly in accordance with an embodiment of the present invention.

FIG. 44A shows a fiber-based cable 354 that has a controller (e.g., a controller such as controller 318 of FIG. 42). As shown in FIG. 44A, controller 345 may have a housing that surrounds portions of the cable. Controller 345 may be a switch, circuitry such as circuitry in a switch-based button assembly with multiple buttons and an optional microphone, or other suitable user interface circuitry (as examples). Controllers such as controller 334 may include circuitry for supporting communications with electronic devices over the wires of cable 354. Controller 345 may have one or more switched-based buttons, such as button 346. Cross-sectional views of cable 354 taken at locations X, Y, and Z are shown in FIGS. 44B, 44C, and 44D.

Figures 44B, 44C, 44D:
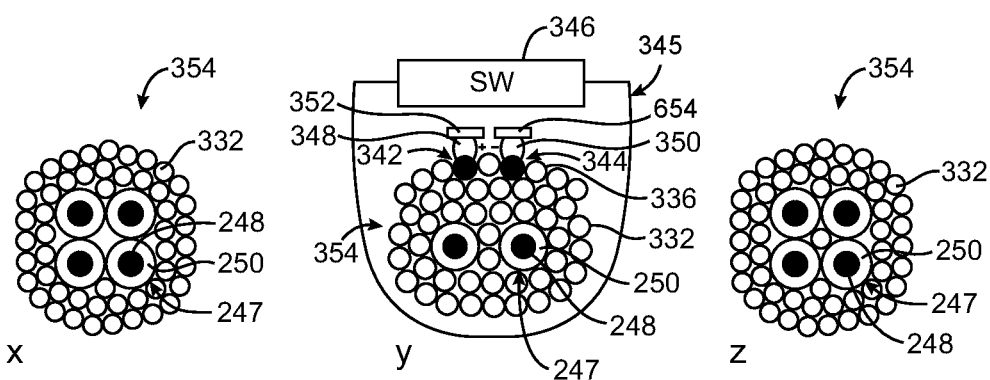
FIG. 44B is a cross-sectional view of a cable of the type shown in FIG. 44A taken along cross-sectional line X-X of FIG. 44A in accordance with an embodiment of the present invention.
FIG. 44C is a cross-sectional view of a cable of the type shown in FIG. 44A taken along cross-sectional line Y-Y of FIG. 44A through the button assembly portion of the cable of FIG. 44A in accordance with an embodiment of the present invention.
FIG. 44D is a cross-sectional view of a cable of the type shown in FIG. 44A taken along cross-sectional line Z-Z of FIG. 44A in accordance with an embodiment of the present invention.

FIG. 44B is a cross-sectional view of cable 354 taken through line X-X of FIG. 44A. Intertwined fibers 332 of FIG. 44B may be monofilament or multifilament wires and may be formed from any suitable material. Insulated conductive wires 247 have insulation 250 surrounding conductive center 248. Four wires 247 are shown in FIG. 44B. In general, cable 354 may have any suitable number of wires. If desired, wires 247 may also be provided in the form of coaxial cables. In FIG. 44B, intertwined fibers 332 are shown as surrounding insulated wires 247.

FIG. 44C is a cross-sectional view through controller 345 and associated button 346 taken along line Y-Y of FIG. 44A. Two of the insulated wires 247 have been positioned on the surface of cable 354 by intertwining tool 14 and have been stripped of their insulations 250. This exposes conductive centers 248 of wires 247 and forms terminals 342 and 344. Terminal 342 may be connected by solder 348 to pad 352 of switch 346 or other circuitry in controller 345. Terminal 344 may be connected by solder 350 to pad 654 of switch 346 or other circuitry in controller 345. When button 346 is pressed by a user, terminals 342 and 344 may be electrically connected (i.e., shorted together) closing the switch. In other arrangements (e.g., arrangements in which controller 345 is formed from more complex circuitry), actuation of button 346 may result in the transmission of communications signals over the wires connected to terminals 342 and 344. The use of a switch to form controller 345 is merely illustrative.

FIG. 44D is a cross-sectional view of cable 354 taken through line Z-Z of FIG. 44A. As in FIG. 44B, insulated conductive wires 247 may be embedded within intertwined fibers 332 by intertwining tool 14. In this region of the cable, wires 247 typically have intact insulation 250 (i.e., insulation that has not been stripped and therefore surrounds conductive centers 248).

During the formation of fiber-based cables such as the cable of FIG. 20, intertwining tool 14 of FIG. 1 may be used to bring insulated wires 247 from within cable 354 (at location X), to the surface of cable 354 (at location Y), and back inside cable 354 (at location Z). After cable 354 is formed, insulation 250 may be stripped from wires 247 at location Y to form terminals 342 and 344. A switch or more complex input-output circuitry may then be connected to terminals 342 and 344. If desired, more than two wires may be stripped and connected to the input-output circuitry. For example, three or more wires may be stripped and connected to switches or more complex circuitry within controller assembly 345, four or more wires may be stripped and connected to switches or more complex circuitry within controller 345, etc.

The foregoing is merely illustrative of the principles of this invention and various modifications can be made by those skilled in the art without departing from the scope and spirit of the invention.

What is claimed is:

1. A fiber-based earbud, comprising:
   a speaker;
   woven fibers that form a fiber-based housing for the speaker, wherein the fiber-based housing comprises a first region through which sound passes from the speaker and a second region that forms a fiber-based tube; and
   an input device in the tube that is configured to detect squeeze input on the fiber-based tube.

2. The fiber-based earbud defined in claim 1 further comprising binder that binds the woven fibers together, wherein the first region has less binder than the second region.

3. The fiber-based earbud defined in claim 1 wherein the fiber-based tube is rigid.

4. The fiber-based earbud defined in claim 3 wherein the woven fibers are more densely packed together in the second region than the first region.

5. The fiber-based earbud defined in claim 1 wherein the first region is free of binder.

6. The fiber-based earbud defined in claim 1 wherein the input device comprises first and second conductors that form a switch.

7. The fiber-based earbud defined in claim 6 wherein the woven fibers comprise conductive fibers that form the first and second conductors.

8. The fiber-based earbud defined in claim 1 wherein the input device comprises a capacitive electrode.

9. The fiber-based earbud defined in claim 8 wherein the woven fibers comprise a conductive fiber that forms the capacitive electrode.

10. The fiber-based earbud defined in claim 1 further comprising a controller that is configured to adjust the sound from the speaker in response to the squeeze input.

11. A fiber-based earbud, comprising:
    woven fibers that form a fiber-based sheath region and a sound-transparent region;
    a speaker configured to emit sound through the sound-transparent region; and
    circuitry within the fiber-based sheath region that is configured to gather user input.

12. The fiber-based earbud defined in claim 11 wherein the circuitry comprises an electrical switch.

13. The fiber-based earbud defined in claim 12 wherein the woven fibers comprise conductive fibers that form the electrical switch.

14. The fiber-based earbud defined in claim 11 wherein the circuitry comprises a capacitive sensor.

15. The fiber-based earbud defined in claim 14 wherein the woven fibers comprise conductive fibers that form the capacitive sensor.

16. A fiber-based earbud, comprising:
    interlaced fibers having a rounded portion and a fiber-based cylindrical portion extending from the rounded portion;
    a speaker mounted in the rounded portion and configured to emit sound; and
    a user input device in the fiber-based cylindrical portion and configured to detect user input on the fiber-based cylindrical portion.

17. The fiber-based earbud defined in claim 16 wherein the interlaced fibers comprise woven fibers.

18. The fiber-based earbud defined in claim 16 wherein the user input device is selected from the group consisting of: an electrical switch and a capacitive sensor.

19. The fiber-based earbud defined in claim 18 wherein the interlaced fibers comprise conductive fibers that form at least part of the user input device.

20. The fiber-based earbud defined in claim 16 wherein the interlaced fibers are more densely packed together in the fiber-based cylindrical portion than the rounded portion.

* * * * *